US007600022B2

(12) United States Patent  
Takamine

(10) Patent No.: US 7,600,022 B2
(45) Date of Patent: Oct. 6, 2009

(54) COMMUNICATION APPARATUS, INFORMATION SHARING SYSTEM AND INFORMATION SHARING METHOD

(75) Inventor: Kouichi Takamine, Kawanishi (JP)

(73) Assignee: Panasonic Corporation, Osaka (JP)

( * ) Notice: Subject to any disclaimer, the term of this patent is extended or adjusted under 35 U.S.C. 154(b) by 833 days.

(21) Appl. No.: 10/842,441

(22) Filed: May 11, 2004

(65) Prior Publication Data

US 2005/0021695 A1   Jan. 27, 2005

(30) Foreign Application Priority Data

May 19, 2003   (JP)   ............................. 2003-141094

(51) Int. Cl.
*G06F 15/173* (2006.01)
*G06F 15/177* (2006.01)
(52) U.S. Cl. ........................ 709/226; 709/220; 358/474; 358/482; 358/494
(58) Field of Classification Search ................. 709/220, 709/226
See application file for complete search history.

(56) References Cited

U.S. PATENT DOCUMENTS

| | | | | |
|---|---|---|---|---|
| 5,561,746 A | * | 10/1996 | Murata et al. ............... | 345/419 |
| 5,610,630 A | * | 3/1997 | Nakamura et al. .......... | 715/788 |
| 5,623,655 A | | 4/1997 | Chisaka | |
| 5,742,294 A | * | 4/1998 | Watanabe et al. ........... | 345/672 |
| 5,963,344 A | * | 10/1999 | Morita et al. ............... | 358/482 |
| 6,734,877 B1 | * | 5/2004 | Honda et al. ................ | 715/721 |
| 6,851,091 B1 | * | 2/2005 | Honda et al. ................ | 715/721 |
| 6,992,782 B1 | * | 1/2006 | Yardumian et al. ......... | 358/1.13 |
| 7,016,865 B1 | * | 3/2006 | Weber et al. ................ | 705/26 |
| 7,034,835 B2 | * | 4/2006 | Whatmough ................ | 345/473 |
| 7,127,723 B2 | * | 10/2006 | Endo et al. .................. | 719/319 |
| 7,130,885 B2 | * | 10/2006 | Chandra et al. ............. | 709/206 |

(Continued)

FOREIGN PATENT DOCUMENTS

JP   05-028138   2/1993

(Continued)

OTHER PUBLICATIONS

Yamashita, N., "Two-Dimensional Graphics Description by XML: fundamental explanation on SVG, XML application technology," Open Design, Feb. 2003, pp. 148-153 (English translation included).

*Primary Examiner*—Hassan Phillips
*Assistant Examiner*—Saket K Daftuar
(74) *Attorney, Agent, or Firm*—Wenderoth, Lind & Ponack, L.L.P.

(57) ABSTRACT

The terminal device 100 of an information sharing system 500 exchanges information mutually with other terminal devices 200 to 400 that are connected via a network 600. A receiving unit 103 receives adoptability information showing update data for updating common data that are shared among a group and adoptability information showing the adoptability of update data. An inputting unit 101 receives an input of the update data and adoptability information from a user. A sending unit 104 sends the inputted update data and adoptability information to another terminal device. A synthesizing unit 105 generates the updated common data by synthesizing the update data with the common data. A judging unit 109 judges adoptability of the update data based on the adoptability information and has the synthesizing unit 105 synthesize only the update data that is judged as adoptable.

16 Claims, 14 Drawing Sheets

U.S. PATENT DOCUMENTS

| | | | |
|---|---|---|---|
| 7,203,531 B2 * | 4/2007 | Kido | 455/575.3 |
| 2001/0029550 A1 * | 10/2001 | Endo et al. | 709/319 |
| 2002/0065701 A1 * | 5/2002 | Kim et al. | 705/9 |
| 2002/0073163 A1 | 6/2002 | Churchill et al. | |
| 2002/0082905 A1 * | 6/2002 | Matsuda et al. | 705/10 |
| 2002/0138582 A1 * | 9/2002 | Chandra et al. | 709/206 |
| 2003/0061569 A1 * | 3/2003 | Aoki | 715/517 |
| 2004/0133547 A1 * | 7/2004 | Doi | 707/1 |
| 2004/0160445 A1 * | 8/2004 | Whatmough | 345/473 |
| 2005/0158100 A1 * | 7/2005 | Yamaguchi et al. | 400/62 |

FOREIGN PATENT DOCUMENTS

| | | |
|---|---|---|
| JP | 07-234810 | 9/1995 |
| JP | 11-272534 | 10/1999 |
| JP | 2001-331469 | 11/2001 |
| JP | 2002-183066 | 6/2002 |
| JP | 2002-288029 | 10/2002 |

* cited by examiner

FIG. 10

```
<?xml version="1.0" standalone="no"?>                                                               ─ 1101

<!DOCTYPE svg PUBLIC"-//W3C//DTD SVG 1.0//EN"
"http://www.w3.org/TR/2000/CR-SVG-20001102/DTD/svg-20001102.dtd">                                    ─ 1102

<svg xml:space="default" width="600" height="400">                                                   ─ 1103
    <rect x="0" y="0" width="600" height="400" fill="white" stroke="black"
stroke-width="3"/>
    <rect x="0" y="200" width="600" height="0" fill="white" stroke="black"                          ─ 1104
stroke-width="1.5"/>
    <rect x="300" y="0" width="0" height="400" fill="white" stroke="black"
stroke-width="1.5"/>

<text x="40" y="100" font-family="MS-PGothic" font-size="20" fill="black">                          ─ 1105
Update 1
</text>

<text x="40" y="300" font-family="MS-PGothic" font-size="20" fill="black">                          ─ 1106
Update 2
</text>

<text x="340" y="100" font-family="MS-PGothic" font-size="20" fill="black">                         ─ 1107
Update 3
</text>

<text x="340" y="300" font-family="MS-PGothic" font-size="20" fill="black">                         ─ 1108
Update 4
</text>
</svg>
```

1100

Synthesis image(=Layer0)

Update data 1(=Layer1)

Update data 2(=Layer2)

Update data 3(=Layer3)

Update data 4(=Layer4)

| Update history | | | |
|---|---|---|---|
| File name | Source | Storage date & time | Update description |
| update1 | terminal100 | 2003/01/07_10:10 | コメント「○○○…」追加 |
| update1 | terminal100 | 2003/01/07_10:17 | コメント「○○○…」削除 |
| update2 | terminal200 | 2003/01/07_10:33 | コメント「△△△…」追加 |
| update2 | terminal200 | 2003/01/07_10:45 | コメント「△△△…」削除 |
| update3 | terminal300 | 2003/01/07_10:47 | コメント「◇◇◇…」追加 |
| update4 | terminal400 | 2003/01/07_10:52 | コメント「×××…」追加 | ns
COMMUNICATION APPARATUS, INFORMATION SHARING SYSTEM AND INFORMATION SHARING METHOD

Japanese Patent application No. 2003-141094 filed on Aug. 19, 2003, is incorporated herein by reference.

BACKGROUND OF THE INVENTION (1) Field of the Invention

The present invention is for providing a communication apparatus, an information sharing system and an information sharing method for exchanging information between a plurality of communication apparatuses that are connected with a network such as a general public phone, the Internet, a Digital Subscriber Line (DSL) and an exclusive line.

(2) Description of the Related Art

Today, various kinds of communication providers provide general consumers or company users with various communication services. As one of these communication services, a voice conference service may be used for conducting a simultaneous conversation by connecting a general telephone, a cellular phone and a personal handyphone system (PHS) that are located in different places from one another. Other services include text conference services or text chat type services where a lot of users share information of data systems such as characters, images and music on the Web as the internet market becomes popular.

The above-mentioned conference system is one of a computer system or an information sharing system that includes a group of a plurality of terminal devices that are connected to each other via the network. In this information sharing system, data that corresponds to a program and the program that is stored in each terminal device is regarded as common data in a group. The system is operated in a way that this common data becomes the latest one in all the terminal devices in the group. In this case, for example, a server device is installed in the group, and this server device tries to maintain consistency of common data by broadcasting update information of the common data that is generated in each terminal device in the group to all the terminal devices in the group.

By the way, as a terminal device in the group may be switched frequently because of halfway participations or halfway withdrawals, in the case where the information sharing system executes an application for many participants, the processing workload in the server device becomes extremely high when trying to maintain the latest status of the common data in each terminal device. Therefore, it becomes difficult to realize an information sharing system economically because this information sharing system requires a high-performance server device.

Therefore, the conventional information sharing system decides one of terminal devices in a plurality of terminal devices according to the predetermination method and regards the decided terminal device as the broadcasting terminal device. The broadcasting terminal device is a terminal device for broadcasting update information concerning the update of the common data to each terminal device in the group (broadcasting terminal deciding process). Next, the information sharing system makes each of the terminal devices send the update information to the broadcasting terminal device that is determined in the broadcasting terminal deciding processing (sending processing). The broadcasting terminal device broadcasts the update information to the terminal device (broadcasting processing). Each of the terminal devices that receive the broadcasted update information updates the common data by the received update information (update processing). In this way, the consistency of the common data that is stored in each terminal device is realized by reducing the processing workload in each terminal device.

FIG. 1 is an illustration of a conventional information sharing system. For example, in the case where the terminal device A is a sending terminal device as shown in FIG. 1, update data A of the common data A is broadcast to the terminal device B, C and D. In the case where the terminal device B is a sending terminal device, update data B of the common data B is broadcast to the terminal devices A, C and D. [Patent Literature 1] Japanese Laid-Open Patent application No. 2001-331469 (the first—page 25, the second figure)

However, in the conventional art, a broadcasting terminal device is uniquely determined every time the data is updated based on the predetermined algorithm and the update data of the common data is sent from the determined broadcasting terminal device to each terminal. Therefore, even in the case where there is an judgment concerning whether the common data is updated using the update data, the receiver side of the update data can only receive the update data because the judgment cannot be reflected. No considerable problem occurs in the case where the terminal devices that form the information sharing system are, for example, a personal computer including a hard disc with a large capacity and a high-speed CPU. However, in the case where the information sharing system includes a terminal device such as a mobile phone which does not contain enough resources, it causes a shortage in a memory region for storing data which is important to the user.

An object of the present invention, even in the case where there is update data, is to provide users with an information sharing system capable of updating the common data and a communication apparatus that forms the information sharing system by reflecting the judgment of each terminal side user who received this common data.

SUMMARY OF THE INVENTION

In order to achieve the above-mentioned object, the communication apparatus of the present invention is for not only sharing information by exchanging the information mutually among a plurality of communication apparatuses that are connected to each other via a network, but also updating the information, comprising:

a first outputting unit operable to output common information that has already been shared or that is sharable; a second outputting unit operable to output update information that is inputted by at least one of the communication apparatus and one or more other communication apparatuses; and a synthesizing unit operable to update the common information by synthesizing the common information with the update information in the case where the update information is received from at least one of the communication apparatus and one or more other communication apparatuses.

The communication apparatus further comprises: a judging unit operable to obtain adoptability information on whether the update information should be adopted or not and judges whether the update information should be adopted or not based on the obtained adoptability information; and a synthesizing unit operable to synthesize the common information with the update information in the case where the judging unit judges that the update information should be adopted.

Also, in the case where the update information is received from at least one of the communication apparatus and one or more other communication apparatuses, the first outputting unit outputs the common information that is updated by the synthesizing unit after the second outputting unit outputs the update information.

In this way, in the case where the communication apparatus outputs an output of the synthesizing unit that is stored in the memory unit to the first outputting unit and receives the information that is newly added or updated, after making a user confirm this in the second outputting unit, it synthesizes it with the output of the synthesizing unit that is stored in the memory unit and updates the output of the first outputting unit. By doing this, it is possible to timely output the information that is sent from an external device to the second outputting unit, perform synthesis processing in the synthesizing unit as appropriate, and output the synthesis information that is updated by the first outputting unit.

Also, the above-mentioned synthesizing unit synthesizes the update information with the common information to make a Scalable Vector Graphics (SVG) that is described in an XML format.

In this way, it is possible to realize efficient synthesis processing by exchanging only SVG files that correspond to the information that is newly added or updated and adding a text that is described in the SVG file to the common information or rewriting the common information. For example, SVG is described in Vector style unlike the GIF and JPEG style that are bit-mapped, it is possible to print high quality pictures with an arbitrary resolution without jagged images that occur at the time of printing bit-mapped images. Also, with the SVG, it is possible to enlarge an arbitrary part, such as update information of images without image deterioration. Further, as it is possible to select or search text contained in the SVG images unlike the bit-mapped images, it is possible to extract and edit the desired information from the SVG images in the case where a part of the synthesis information is updated.

Also, the synthesizing unit of the present invention synthesizes the update information with the common information as a Scalable Vector Graphics (SVG) that is described in an XML format to which history management information including update data and time and sending source information is added.

Doing this makes it possible to synthesize the synthesis information that is stored in the storage unit and the update history and output them, which is convenient for confirming the update status.

Also, the above-mentioned synthesizing unit further generates a list of update information for every sending source based on history management information that is added to a Scalable Vector Graphics (SVG) of the update information.

Doing this makes it possible to confirm the update status of each sending source.

Further, the communication apparatus of the present invention further comprises a sending unit operable to send the update information that is received by the inputting unit to other communication apparatuses, wherein, after user input of the update information that is received by the inputting unit is established, the sending unit sends the update information to other communication apparatuses, the second outputting unit outputs the update information and the synthesizing unit synthesizes the update information with the common information.

Doing this makes it possible to send this new information to a related unit immediately in the case where information is newly added or updated.

Further, the communication apparatus of the present invention comprises: an (Scalable Vector Graphics) SVG file generating unit that generates the update information received by the inputting unit as the SVG file that is described in an SML format, and a sending unit that sends the SVG file that is generated by the SVG file generating unit to another communication apparatus.

This is convenient because it is possible to handle characters, still pictures, moving pictures and the like using the SVG file that is described in a plane text style. Also, as the SVG file has a higher compression rate at the time of compression compared with the JPEG or GIF images, it is advantageous in file transmission.

Further, the communication apparatus of the present invention comprises: a judgment unit for obtaining adoptability information concerning whether the update information that is received by the inputting unit or the receiving unit should be adopted or not, and judging whether the update information should be adopted based on the obtained adoptability information; and a synthesizing unit that synthesizes the common information that is stored in the update information and the memory unit in the case where the judgment unit judged that it should be judged.

Also, the judgment unit makes the judgment based on the result of the majority rule performed on the adoptability information or the decisions made by a predetermined number of communication apparatuses from among all the communication apparatuses including the communication apparatus itself and the other communication apparatuses.

In this way, the synthesizing unit can judge whether the update information should be synthesized or not based on a majority rule or a right judgmental standard by reflecting user intentions of the respective communication apparatuses that are registered as a group.

Further, the communication apparatus of the present invention comprises: a setting unit for setting the right concerning the sending of the adoptability information; a judgment unit that makes the judgment based on the adoptability information that is obtained from the communication apparatus to which the right is given.

Also, the setting unit sets a right level indicating any levels that are two or more as the right. The judging unit makes the judgment based on the adoptability information from the specific communication apparatus for which the right level to be finally decided is set as the right level.

By doing this, it is possible to set the level of the right for judging whether new information should be adopted or not for each communication apparatus that is registered as a group and make an adoptability judgment on new information based on this right level.

Further, the communication apparatus of the present invention comprises: an inquiring unit for inquiring of a user about whether the update information received by the receiving unit should be adopted or not as a synthesis target by the synthesizing unit; and an adoptability information sending unit for sending the information obtained by the user in response to the inquiry to other communication apparatuses.

Doing this makes it possible to perform adoptability judgment on new information based on this right level by setting the level of the right for judging whether the new information should be adopted to each communication apparatus that is registered as a group.

Further, the communication apparatus of the present invention comprises: an inquiring unit for inquiring of a user about whether the update information that is received by the receiving unit should be adopted or not as a synthesis target by the synthesizing unit; and an adoptability information sending unit for sending the information that is obtained from the user in response to the inquiry to other communication apparatuses as adoptability information.

In this way, in the case where the information is received from outside the communication apparatus, it is possible to make a judgment by the user of the communication apparatus, whether it should be adopted or not as new information.

Further, the communication apparatus of the present invention comprises: a printer engine for generating the printing data as to the common information that is outputted by the first outputting unit and print it.

In this way, the image forming device to which the communication apparatus of the present invention is applied.

Also, the above-mentioned communication apparatus is a cellular phone, a Personal Digital Assistance (PDA), a digital camera, a receiver capable of receiving the contents that is described in Broadcast Markup Language (BML) contents from a broadcast station.

In this way, it is possible to provide a cellular phone, a Personal Digital Assistance (PDA) or a digital camera, or a receiver capable of receiving the contents that is described in Broadcast Markup Language (BML) contents, to all of which a communication apparatus of the present invention is applied.

Also, the information sharing system of the present invention comprises: a plurality of communication apparatuses that are connected to each other via a network and are the information sharing system for repeatedly updating the information as well as sharing the information by exchanging information mutually among the plurality of communication apparatuses. The communication apparatuses comprises: the first outputting unit operable to output the common information that has already been shared with each other or that is sharable; the second outputting unit for outputting the update information that is inputted from at least one of the communication apparatus and one or more other communication apparatuses; a judging unit operable to judge whether the update information should be adopted or not based on the obtained adoptability information by obtaining the adoptability information concerning whether the update information should be adopted or not; and a synthesizing unit operable to update the common information by synthesizing the common information with the update information in the case where the judging unit judges that the update information should be adopted.

In this way, a judgment on whether the new information should be synthesized with the synthesis information or not is made based on the adoptability information from the other communication apparatus. In the case where the new information is synthesized, it is possible to realize the information sharing system for sending to the other communication apparatus, the update synthesis information on which synthesis processing is performed by the other communication apparatus.

Note that the present invention can be realized as an information sharing system with a plurality of communication apparatuses and cellular phones, as a single communication apparatus or cellular terminal that comprises the information sharing system of the present invention, an information sharing method that makes the characteristic components of a single communication apparatus, a single cellular terminal and an information sharing system, and a program that causes a computer to execute these steps. Subsequently, it is needless to say that the program can be distributed via a computer-readable recording medium such as a CD-ROM or a communication medium such as a communication path.

BRIEF DESCRIPTION OF THE DRAWINGS

These and other subjects, advantages and features of the invention will become apparent from the following description thereof taken in conjunction with the accompanying drawings that illustrate a specific embodiment of the invention.

In the Drawings:

FIG. 10 is a diagram showing the description example 1100 of the update data (1 to 4) by XML.

FIG. 11 is a diagram showing images before and after synthesizing the update data 1 to 4.

FIG. 13 is a diagram showing a display example in the case where update history is displayed as a synthesis image.

FIG. 14 is a diagram showing the concept of a report making system and an example of common data in the second embodiment.

DESCRIPTION OF THE PREFERRED EMBODIMENT(S)

Embodiments of the present invention will be explained in detail with reference to figures below.

First Embodiment

Figure 1:
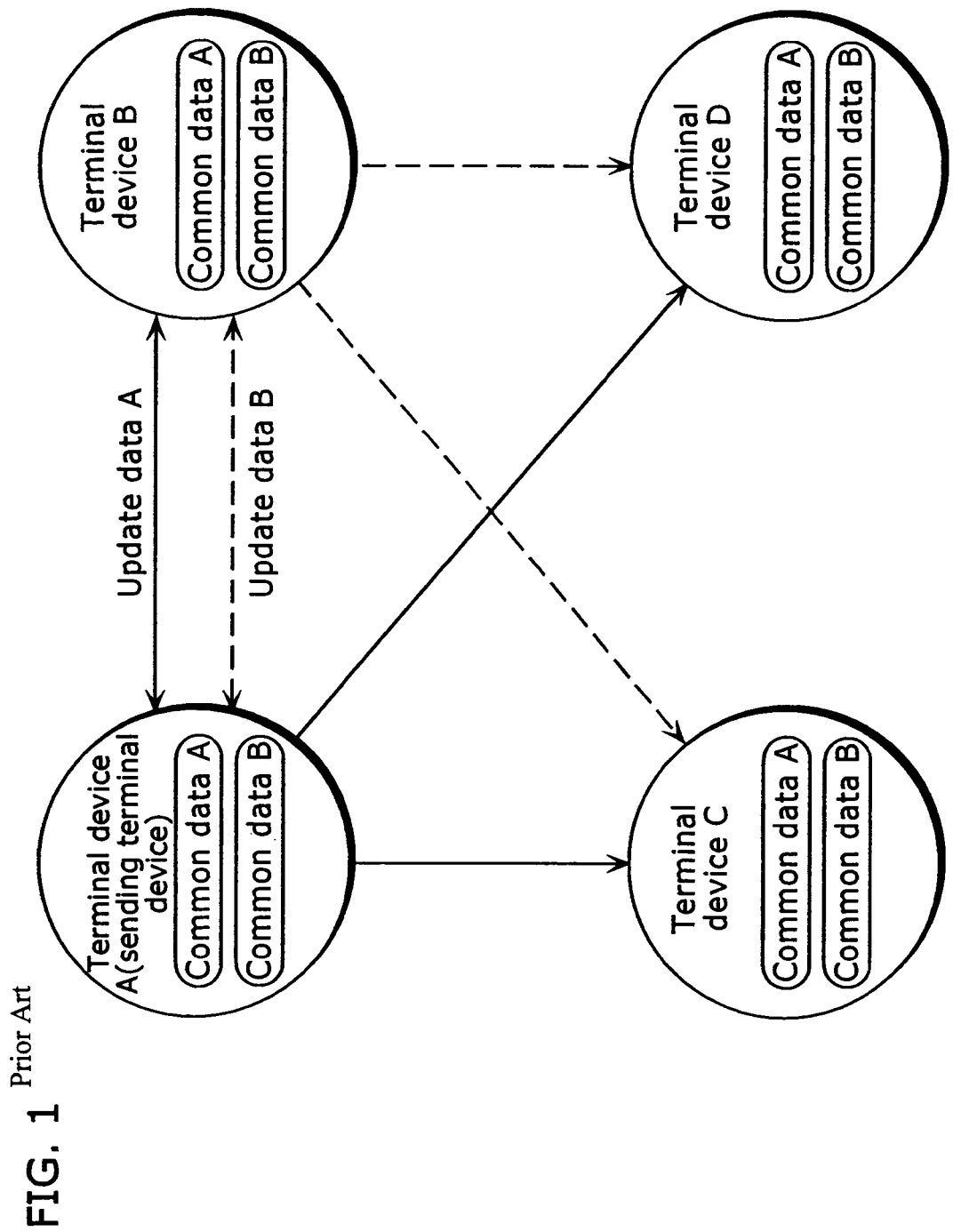
FIG. 1 is a diagram for explaining the concept of the conventional information sharing system.
Figure 2:
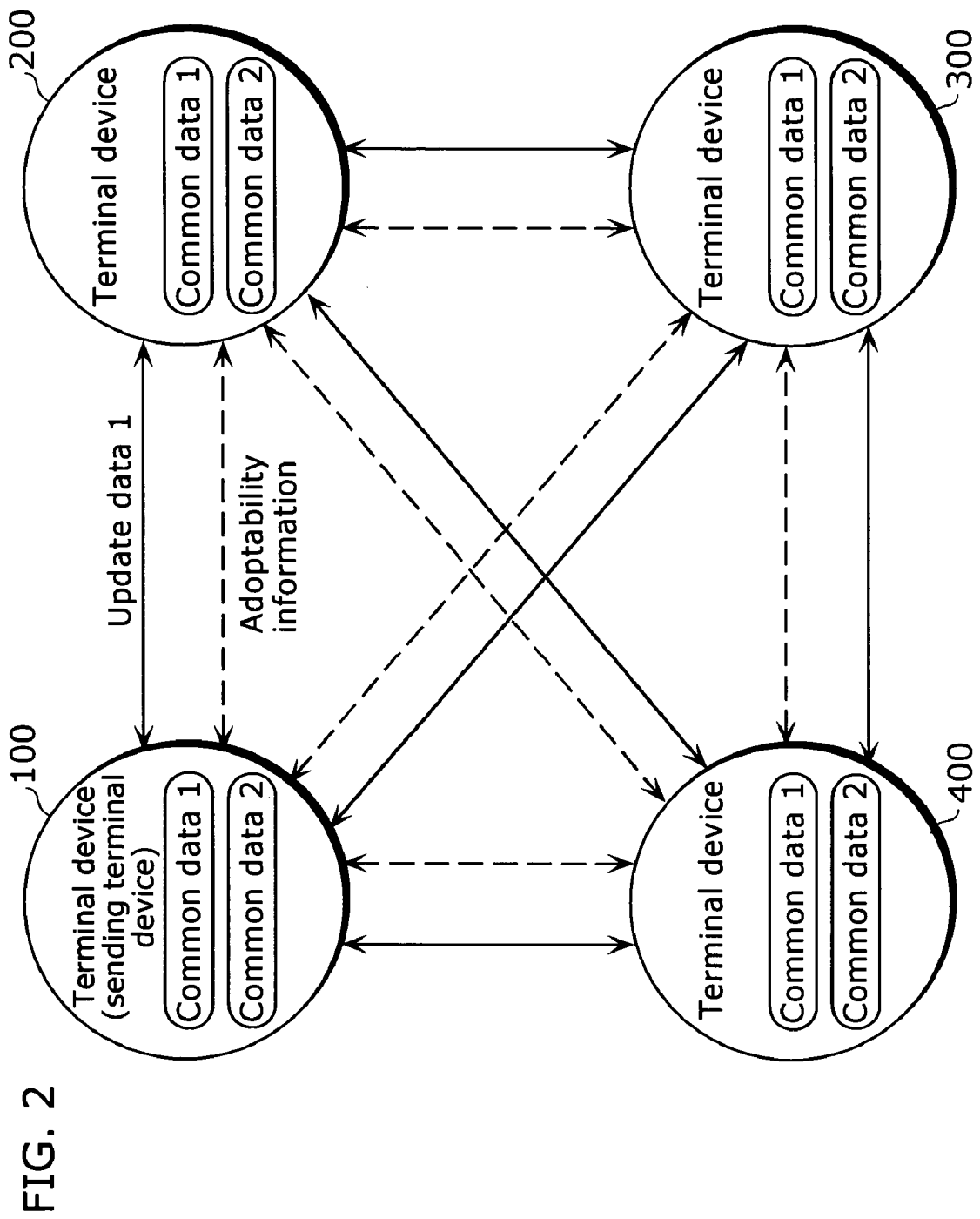
FIG. 2 is a conceptual rendering for explaining the outline of the information sharing system of the present invention.

FIG. 2 is a conceptual rendering for illustrating the outline of the information sharing system of the present invention. The information sharing system is the system for judging whether the update data is adoptable or unadoptable based on the adoptability information from each terminal device. The information indicates user opinion of "want to adopt" or "not want to adopt" concerning the update data for updating the common data and updating the common data using the adopted update data. The information sharing system includes a terminal device 100, a terminal device 200, a terminal device 300 and a terminal device 400. The terminal device 100, the terminal device 200, the terminal device 300 and the terminal device 400 each are a "communication apparatus" as recited in the claims of the present invention. After deciding adoptability of the update data, each terminal device serves a role of sending terminal device broadcasts each time a user inputs the update data by an input operation from the user and only the terminal device that becomes the sending terminal device broadcasts the update data that is made inside to each terminal device in the group. Here will be explained a case where the first sending terminal device is terminal device 100, and the terminal device 100, the terminal device 200, the terminal device 300 and the terminal device 400 share common data 1 and common data 2.

First, the terminal device 100 of the sending terminal device broadcasts this update data to each terminal device other than the terminal device (terminal device 100) in response to a user inputting update data by an input operation. For example, the terminal device 100 broadcasts the update data 1 of the common data 1 to the terminal device 200, terminal device 300 and the terminal device 400. Until the time when the terminal device 100 judges the adoptability of the update data 1 that is broadcast, the terminal device other than the terminal device 100 cannot send the update data that is made inside and sends the adoptability information to the update data that is received from outside to the terminal device (here, for example, a terminal device with a final balance) for judging whether the update data is adoptable or not. After that, the terminal device 100 finishes the role of sending terminal device broadcasts and any terminal devices including the terminal device 100 for which update data is inputted by the user input operation as the next sending terminal device. Here, the decision method of the sending terminal device in the information sharing system is not the focus of the present invention and its explanation will be omitted.

In the case where any of terminal devices other than the terminal device 100 operates as a sending terminal device, like in the case where the terminal device 100 is a sending terminal device, only the sending terminal device broadcasts the update data that is made inside. After that, when the adoptability of the broadcast update data is decided, any of the terminal devices for which update data is inputted by the user input operation serves as a sending terminal device.

In this way, the information sharing system of the present invention includes the following functions: a function for enabling each terminal device that received the update data that is broadcast from the sending terminal device to send the adoptability information showing whether the update data should be adopted or not to other terminal devices and deciding whether the update data should be adopted based on this adoptability information or not, and a function for updating the basic data by synthesizing the common data (called basic data below) and the update data that becomes adoptable based on the adoptability information.

The communication apparatus of the present invention and the information sharing system will be explained with reference to FIG. 3.

Figure 3:
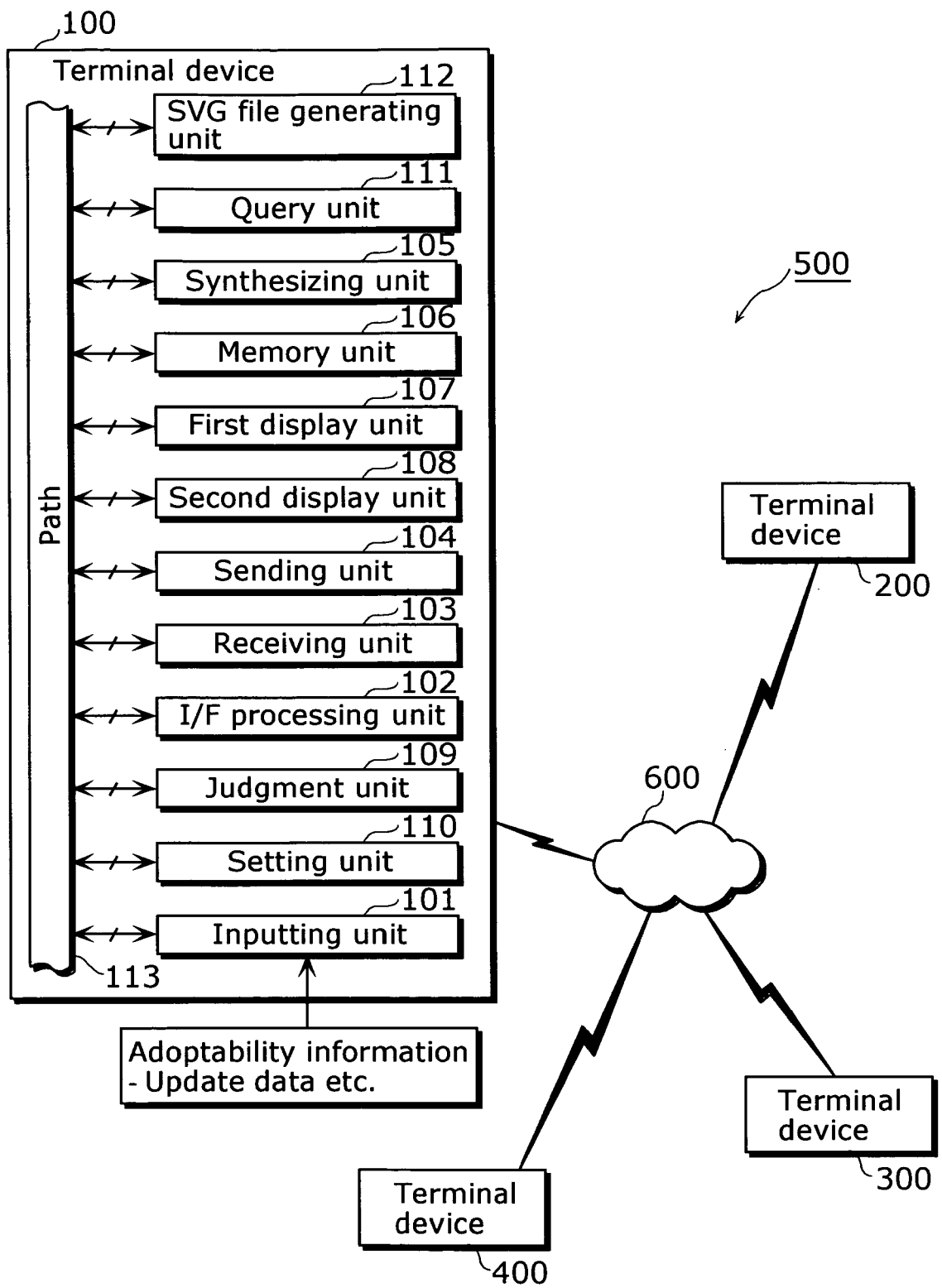
FIG. 3 is a block diagram showing the structure of the information sharing system of the first embodiment.

FIG. 3 is a block diagram showing the structure of the information sharing system 500 of the first embodiment. The terminal device 100, the terminal device 200, the terminal device 300 and the terminal device 400 are user side terminals for a multi-media conference that is held at many places in the information sharing system 500 where a plurality of users share data. In these terminal devices, the terminal device 200, the terminal device 300 and the terminal device 400 are user side terminal devices that have similar functions as the terminal device 100, and can be realized by connecting each component that is the same as the terminal device 100 using a bus. Therefore, explanation on the structure of the terminal device 200, the terminal device 300 and the terminal device 400 will be omitted here. Also, here, the terminal device 100 functioning as a sending terminal device sends the update data 1, and the terminal device 200, the terminal device 300 and the terminal device 400 as the other terminal devices receive the update data 1 that is sent from the terminal devices.

An example of the case where the information sharing system 500 of the present invention is applied to a multi media conference will be explained below. First, the structure of the terminal 100 will be explained.

The terminal device 100 is one of the user side terminal devices that are located at many places and that enable a plurality of users to participate in the same multi-media conference. The terminal device 100 includes an inputting unit 101, an I/F processing unit 102, a receiving unit 103, a sending unit 104, a synthesizing unit 105, a memory unit 106, a first displaying unit 107, a second displaying unit 108, a judging unit 109, a setting unit 110, an inquiring unit 111, an SVG file generating unit 112 and a bus 113.

The inputting unit 101 includes an operating unit such as a keyboard and a mouse. The operating unit receives input of adoptability information showing whether the update data received from outside in the receiving unit 103 should be adopted as the update data, input for setting the right level of the terminal device 100 and the input for a user updating the common data (making the update data) by a user operating the operating unit.

The I/F processing unit 102 performs connecting processing to the network 600 so as to communicate with the external devices of the terminal device 100.

The receiving unit 103 receives the update data, the adoptability information and the like based on the terminal device (such as the terminal device 200, the terminal device 300 and the terminal device 400) outside the terminal device 100.

The sending unit 104 sends the adoptability information and the update data that are inputted in the inputting unit 101 by the user of the terminal device 100 to the terminal devices (for example, the terminal device 200, the terminal device 300 and the terminal device 400) outside the terminal device 100.

The synthesizing unit 105 synthesizes the basic data of the common data that has already been adopted with the update data to be adopted based on the adoptability information.

The memory unit 106 is a memory area for maintaining the synthesis data that is synthesized in the common data and the synthesizing unit 105.

The first displaying unit 107 displays the synthesis data that is stored in the memory unit 106.

The second displaying unit 108 displays the common data, the update data that is received in the inputting unit 101 or received in the receiving unit 103 and the adoptability information.

The judging unit 109 judges whether the update data should be adopted or not based on the adoptability information received from the adoptability information that is inputted in the inputting unit 101 and the adoptability information that is received from outside the terminal device 100.

The setting unit 110 generates the setting information showing the right for voting on the adoptability of the update data, presence/absence of the right for judging adoptability of the update data by the judging unit 109 or the level of the right (priority) and the like and stores them inside. To be more specific, as to the update data that is inputted from the inputting unit 101 and the update data that is received in the receiving unit 103 from outside, the right for voting on the adoptability of the update data, the setting of whether the terminal device 100 has the right for judging the adoptability and the right level of the terminal device 100 are set. The rights that are set in the setting unit 110 are, for example, as follows:

"11"=final balance (the right for a final decision as to whether the update data should be adopted or not)

"10,"=representative final balance (the right for executing the representative final balance in the case where the user of the terminal device with the final balance does not participate in)

"01"=have right (capable of voting as to adoptability of the update data)

"00"=have not right (incapable of voting as to adoptability of the update data)

Whether the update data should be adopted or not is judged in the terminal device 100 including the update data that is inputted from the inputting unit 101 of the terminal device 100 in the above-mentioned explanation, but the update data that is inputted in the inputting unit 101 of the terminal device 100 may be excluded from the target of adoptability judgment.

The inquiring unit 111 inquires of a user of the terminal device 100 about the adoptability of the update data that is received from the external terminal device in the receiving unit 103.

The SVG file generating unit 112 generates the SVG file showing the update data to be sent to each terminal device based on the common data that is updated by the user of the terminal device 100 by operating the inputting unit 101.

Figure 4:
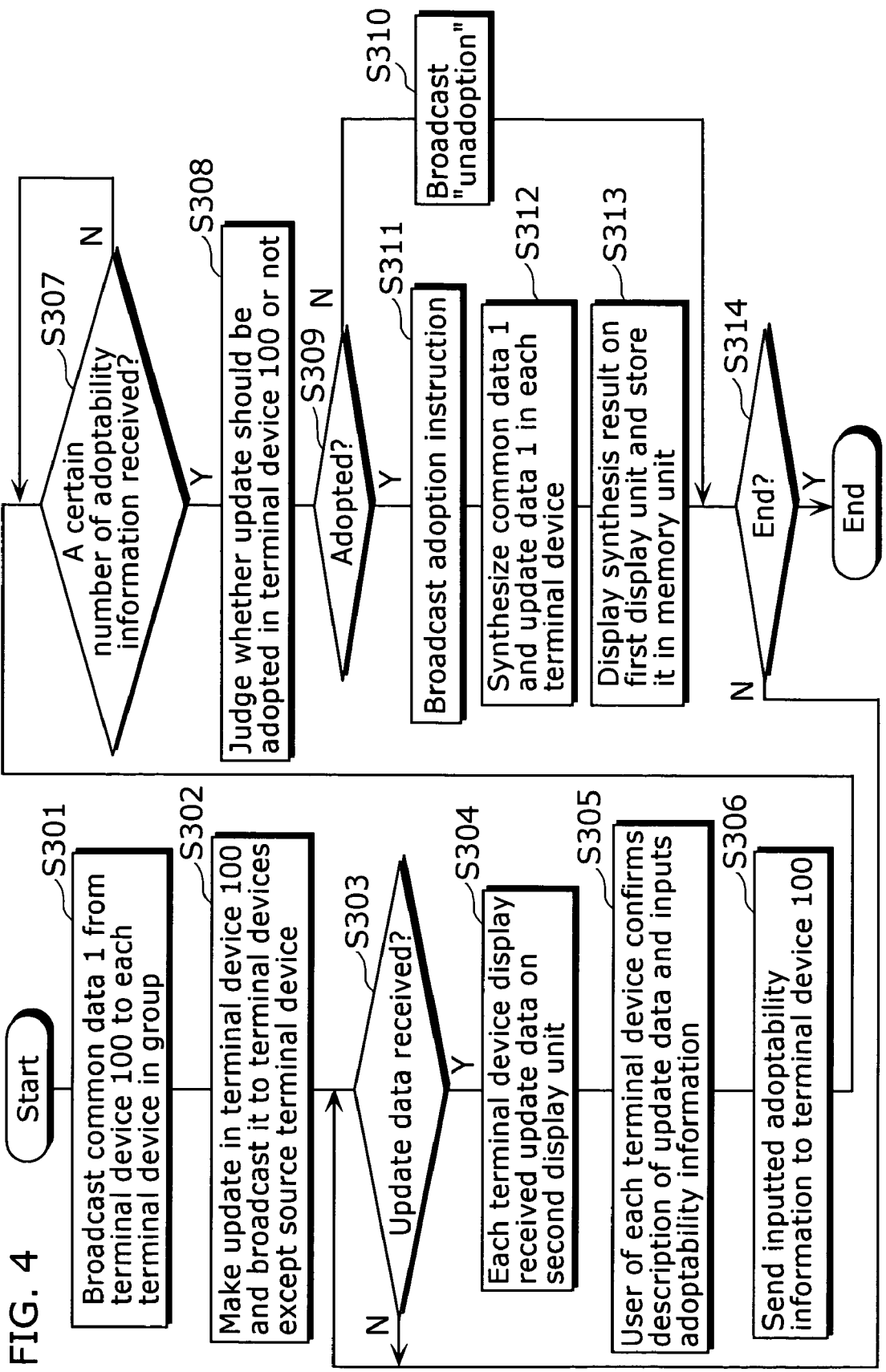
FIG. 4 is a flowchart showing the update processing flow of the common data in the information sharing system shown in FIG. 2.
Figure 5:
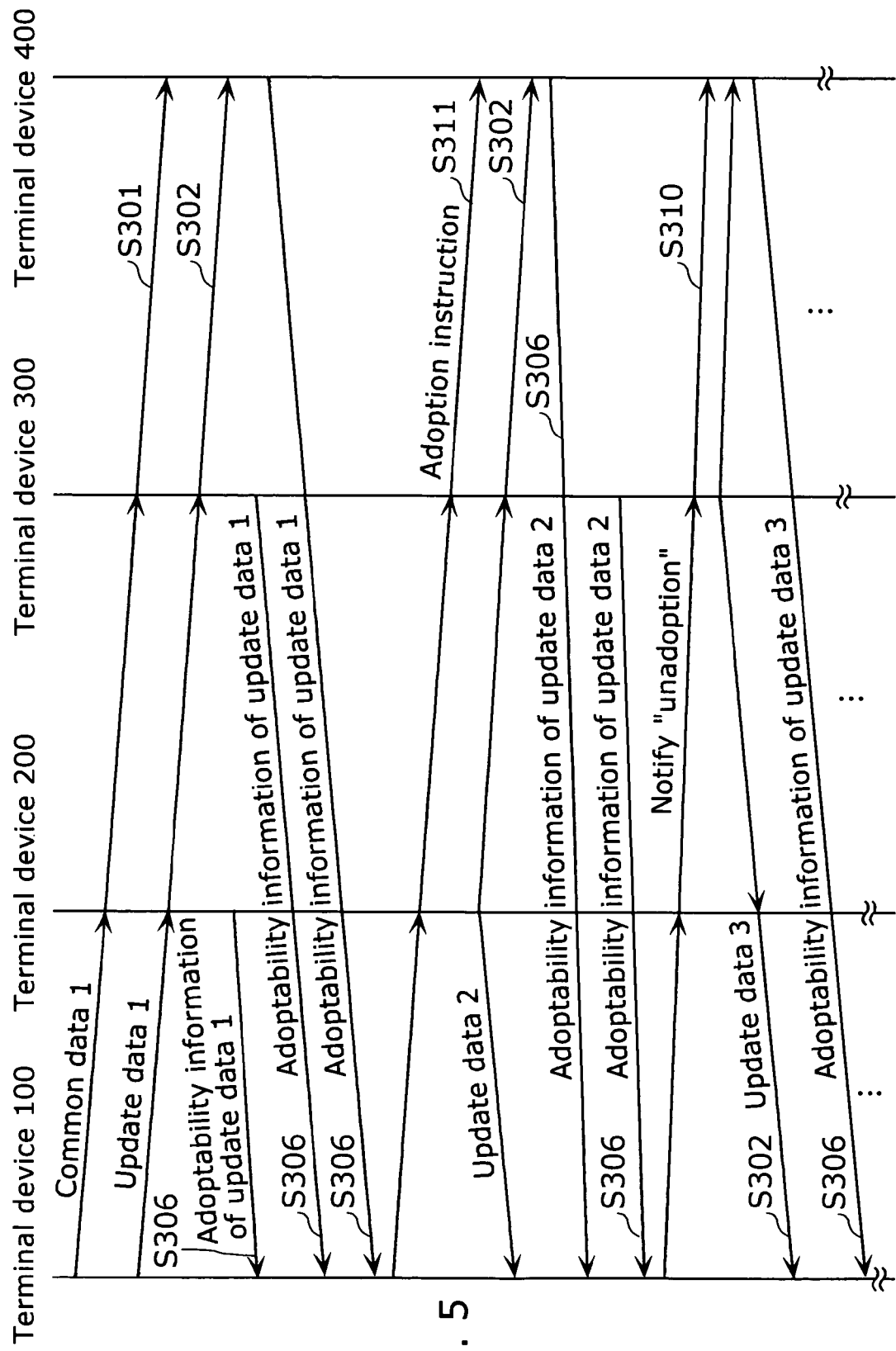
FIG. 5 is a communication sequence diagram showing the data flow in the information sharing system shown in FIG. 2.

Next, the operation of the information sharing system will be explained with reference to FIG. 2, FIG. 3 and FIG. 4. FIG. 4 is a flow chart showing the flow of the update processing of the common data in the information sharing system shown in FIG. 2. FIG. 5 is a communication sequence diagram showing the flow of the data in the information sharing system 500 shown in FIG. 2. In the figure, the same step numbers are assigned to the parts that correspond to each step shown in FIG. 4.

Here, providing that the terminal device 100 shown in FIG. 2 and FIG. 3 are set at point A, the terminal device 200 is set at point B, the terminal device 300 is set at point C and the terminal device 400 is set at point D. The terminal device 100 placed at point A, the terminal device 200 placed at point B, the terminal device 300 placed at point C, the terminal device 400 placed at point D are connected to each other via the network 600 and exchange information mutually. The terminal device 100, the terminal device 200, the terminal device 300 and the terminal device 400 are registered as the terminal devices that form the information sharing system 500 that belong to a group, and the information concerning the group registration of member data showing the registration members.

In the case where the terminal devices of the present invention are used as the terminal devices from a multimedia conference, any of terminal devices that are registered as a group calls the other terminal devices in the group, and the users of the called other terminal devices respond to the call, which makes it possible to realize an interactive communication. In order to simplify the explanation, an example of communication between the two points of the A point and the B point will be explained below.

In these terminal devices that are registered as a group including the terminal device 100, whether or not each terminal device has the right for voting as to whether the update data should be adopted or not, whether or not the right for judging whether the update data should be adopted, and the right level is previously set. Here, for example, the final balance "11" is set in the terminal device 100 and the following explanation will be made providing that "have right=01", is set in all the terminal devices that are registered in a group.

The terminal device 100 outputs connection requests to the other terminals that are registered in a group according to the user input. In other words, the sending unit 104 of the terminal device 100 sends the connection request to the I/F processing unit of the terminal device 200 via the I/F processing unit 102 and the network 600. The terminal device 200 receives the connection request from the terminal device 100 and establishes the connection by confirming that it is the connection request from a device that is registered as a group. In other words, the I/F processing unit of the terminal device 200, on receiving the connection request from the terminal device 100, refers to the group registration information (not shown in any figure) that is stored in the memory unit in the terminal device 200, and judges whether it is the connection request from the device that is registered as a group. After that, in the case where it is confirmed as the connection request from the device that is registered as a group, the connection between the terminal device 200 and the terminal device 100 is established. In this way, it becomes possible to share the communication and the information between the terminal device 200 and the terminal device 100.

The terminal device 100 shares the common data 1 and broadcasts this common data 1 to the other devices that are registered as a group (S301). For example, preparing this common data 1 as materials that will be used for the conference, distributing the common data 1 to the rest of terminal devices that are registered in a group completes the distribution of the conference materials.

Here, provided that a conference where the terminal device 100 and the terminal device 200 refer to the common data 1 as basic data is happening, and the common data 1 is updated.

The user of the terminal device 100 inputs the update data from the inputting unit 101. The update data that is inputted from the inputting unit 101 is inputted to the SVG file generating unit 112 and the SVG file of the update data is generated by the SVG file generating unit 112. The terminal device 100 broadcasts the SVG file that is generated by the SVG file generating unit 112 to the other terminal devices (terminal device 200) as the update data 1 of the common data 1 (S302).

The other terminal devices that received the update data 1 (S303) output (display) this to the second displaying unit 208 (S304) and inquires of the user about the adoptability of the update data 1 by the inquiring unit 112. The user of the terminal device 200 confirms the description of the update data 1 that is outputted (displayed) to the second displaying unit 208 and inputs the information as to whether the update data 1 should be adopted or not from the inputting unit 101 (S305).

The other terminal devices send the adoptability information indicating whether the update data 1 should be adopted or not to the terminal device 100 via the sending unit 204, the I/F processing unit 202 and the network 600 (S306).

In the receiving unit 103 of the terminal device 100, on receiving predetermined number of adoptability information from the other terminal devices via the network 600 and the I/F processing unit 102 (S307), the judging unit 109 judges whether the common data 1 should be synthesized with the update data 1 in the synthesizing unit 105 or not based on the received adoptability information (S308).

Here, the judgment by the judging unit 109 will be explained in detail.

The judging unit 109 of the terminal device 100 judges whether the update data 1 should be adopted or not using the majority rule (S309) based on the adoptability information that is received from the other terminal devices (the terminal device 200, the terminal device 300 and the terminal device 400). In the case where the judgment result by the judging unit 109 is "adoptable", the judging unit 109 sends the adoptability instruction of the update data to the synthesizing unit 105 of the terminal device 100 and broadcasts it to the other terminal devices (the terminal device 200, the terminal device 300 and the terminal device 400) via the network 600 (S311). To be more specific, the terminal device 100, in the case where the adoptability information showing "adoptable" is the majority as the result of the majority rule, sends the adoption instruction that is an instruction indicating that the common data 1 is synthesized with the update data 1 to the synthesizing unit 105 inside and broadcasts it to the other terminal devices.

The synthesizing unit 105 of the terminal device 100 receives the adoption instruction from the judging unit 109 and synthesizes the common data 1 with the update data 1, both of which are stored in the memory unit 106. Also, in the other terminal devices that received the adoption instruction from the terminal device 100, the common data 1 and the update data 1 that are received are synthesized with each other (S312).

The terminal device 100 stores the synthesis result of the synthesizing unit 105 in the memory unit 106, outputs it to the first displaying unit 107 and displays it. Also, in the other terminal devices that received the adoption instruction from the terminal device 100, the synthesis result is stored in the memory unit and displayed on the first displaying unit (S313).

On the other hand, in the case where the adoptability information indicating "adoptable" is the majority as a result of using majority rule in the judging unit 109 in the step S309, the judging unit 109 sends the instruction showing unadoptable of the update data to the synthesizing unit 105 of the terminal device 100 and broadcasts it to the other terminal devices (the terminal device 200, the terminal device 300, the terminal device 400) via the network 600 (S310). The terminal device 100 does not perform synthesis processing by the synthesizing unit 105 and thus, the common data 1 is not updated as it is. Therefore, the output (display) of the first displaying unit 107 is not updated, and thus, the common data 1 is kept outputted (displayed). In the other terminal devices, synthesizing processing by the synthesizing unit is not performed and the common data 1 is not updated as it is.

Next, each terminal device checks whether or not the instruction indicating that the processing end is inputted or not from the user (S314) In the case where the end instruction has not been inputted yet, it returns to the processing in the step S303 and waits for the reception of the update data from the other terminal devices. In contrast, in the case where the end instruction has already been inputted, the processing up to this point finishes.

Here, the explanation has already been made providing that the adoptability information of the update data that is directly inputted by the user of the terminal device 100 from the inputting unit 101 is not made, but it is possible to make adoptability information as to the update data that is directly inputted from the inputting unit. Especially in the case where the number of the other terminal devices excluding the terminal device 100 or the number of the terminal device that has the right for voting as to whether the update data should be adopted or not based on the adoptability information is an even number and the adoptability of the update data is judged by the majority rule, it is desirable that the adoptability information as to the update data that is directly inputted from the inputting unit be made. In this case, the number of the adoptability information including the adoptability information of the terminal device 100 is determined as an odd number and performs a majority rule by the judging unit 109. In this way, even when the numbers of "adoptable" and "unadoptable" of the adoptability information are equal to each other by the rest of terminal devices other than the terminal device 100, including the adoptability information of the terminal device 100 makes it possible to obtain the result of the majority rule. Therefore, when making a judgment by the judging unit 109, it may switch whether the adoptability information of the terminal device 100 should be included or not according to the number of the other terminal devices that are registered as a group. In other words, adoptability information of the terminal device 100 is included in the case where the number of the terminal devices other than the terminal device 100 that are registered as a group is an even number, but adoptability information of the terminal device 100 is not included in the case where the number of the terminal devices other than the terminal device 100 that are registered as a group is an odd number. In this case, as to the update data that is directly inputted to the inputting unit, inquiry by the inquiring unit 111 may be performed or may not be performed. In the case of not inquiring, it is possible to always generate the adoptability information indicating "adoptable", attach it to the update data and send it. In this way, the adoptability information that is attached to the update data may be a flag indicating "unadoptable" in the case of "0" and "adoptable" in the case of "1".

Also, in the explanation of the judgment by the above-mentioned judging unit 109, an example of judging adoptability of the update data using the majority rule based on the adoptability information from the terminal that is registered as a group has already been explained, but embodiments are not limited to this. For example, the judging unit may judge that the update data should be adopted in the case where it is judged as adoptable in a predetermined number of terminals (for example, two terminals) within the number of terminal devices that are registered as a group (four terminals including the terminal device 100 here).

Further, the timing for switching sending terminal devices in the information sharing system 500 is every time when the adoptability of update data is judged, and the present sending terminal device finishes the role, and any of terminal devices in which update data is inputted by the input operation from the user of the terminal device But, the embodiment is not limited to this. For example, the sending terminal device that broadcasts the update data may exchange roles of one of the other terminal device and a sending terminal device without operating as a sending terminal in sequence. In this case, the terminal device that becomes a new sending terminal device does not broadcast the update data that is made inside the terminal device until the adoptability of the update data that is received from the terminal device that was the previous sending terminal device is judged.

Also, up to this point, the adoptability of the update data is judged based on the adoptability from the other terminal devices after determining a terminal device for judging adoptability of the update data as a specific terminal device (terminal device 100), a different method may be used for judging the adoptability of the update data. For example, each of all the terminal devices that are registered as a group may judge the adoptability of the update data. In this case, each terminal device broadcasts the adoptability information that is made as to the update data to all the terminal devices in the group, each terminal device judges the adoptability of each update data based on the adoptability that is received from the other terminal devices and synthesizes the update data that is judged as "adoptable" with the common data. In this case, there is no need to send the judgment result in each terminal device to the other terminal device.

Figure 6:
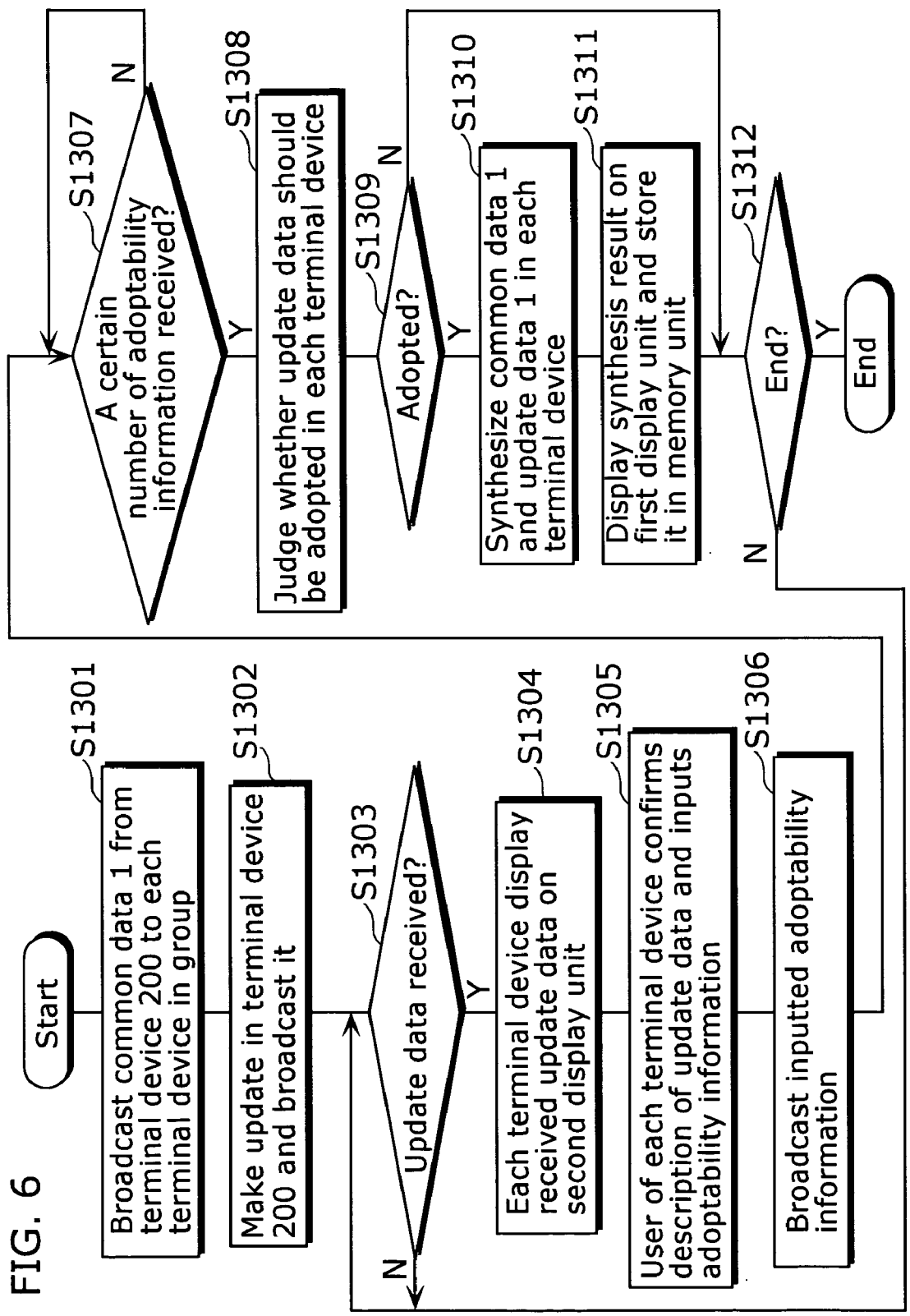
FIG. 6 is a flowchart showing an example of the operation of the information sharing system in the case where each terminal device judges adoptability of the update data.
Figure 7:
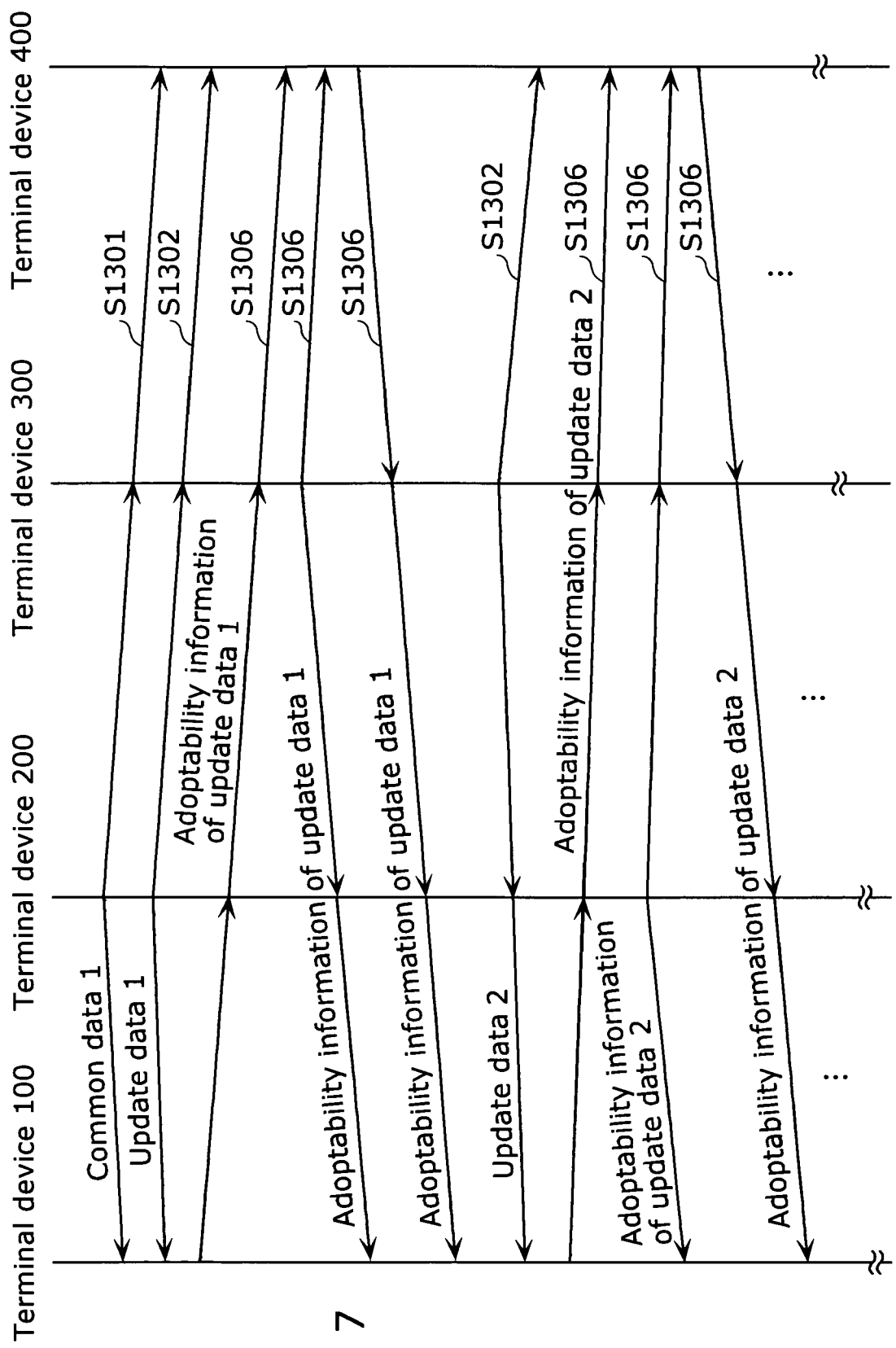
FIG. 7 is a communication sequence showing the data flow in the information sharing system in the case where each terminal device judges adoptability of the update data.

FIG. 6 is a flow chart showing an example of the operation of the information sharing system 500 in the case where the adoptability of the update data is judged in each terminal device. FIG. 7 is a communication sequence diagram showing the flow of the data in the information sharing system 500 in the case where the adoptability of the update data is judged in each terminal device. Here, the case where the terminal device 200 is a sending terminal device will be explained first. First, the terminal device 200 broadcasts the common data 1 to each terminal device (the terminal device 100, the terminal device 300 and the terminal device 400) in the system (S1301), and broadcasts the update data that is generated inside to the rest of the terminal devices (S1302). Each terminal device that received the update data (S1303) displays the received update data on the second displaying unit (S1304) and inquires of the user about whether the received update data should be adopted or not. The user of each terminal device confirms the contents of the update data that is displayed on the second displaying unit and inputs the adoptability of the update data (S1305). Each terminal device generates the adoptability information according to user input and broadcasts other terminal devices (S1306). In each terminal device, adoptability information is repeatedly received and kept waiting until a predetermined number of adoptability information is received, when the number of the received adoptability information reaches the predetermined number (S1307), the judging unit performs a majority rule based on the received adoptability information and judges whether the received update data should be adopted or not (S1308). In the case where it is judged that the update data is to be adopted in the judging unit of each device (S1309), the common data 1 is synthesized with the update data in the synthesizing unit (S1310), the synthesis result is displayed in the first displaying unit and stored in the memory unit (S1311). After that, each terminal device judges whether the instruction indicating that the update processing of the common data 1 finishes has already been inputted or not from the user (S1312). In the case where the instruction indicating that the update processing finishes has not been inputted yet, it waits until new update data is received (S1303) and performs the following processing. In the case where the instruction indicating that the update processing finishes has already been inputted, the update processing of the common data 1 finishes.

Each terminal device judges (S1312) whether there is the input of an instruction including that the update processing finishes instead of performing the processing in step S1310 and step S1311 in the case where it is judged that the update data should not be adopted in step S1309 or each terminal device waits until new update data is received (S1303) in the case where there is no input of an instruction indicating that the update processing finishes. And, then the following processing is performed. Also, it finishes the update processing of the common data, in the case where there is an input of instruction indicating that the update processing finishes.

Also, up to this point, the terminal device that judges the adoptability of the update data is determined as the terminal device with the final balance, but the sending terminal device may judge the adoptability of the update data regardless of the right that is set in each terminal device.

Also, up to this point, the adoptability of the update data is judged by the majority rule based on the adoptability information from the terminal device with the voting right, but, further, in the case where it cannot be judged because the number of "adoptable" is equal to the number of "unadoptable" in the result of the majority rule, the adoptability of the update data may be judged according to the adoptability information of the terminal device with the final balance. For example, the final balance="11" is set at the specific terminal device and whether the update information should be adopted or not is finally judged based on the adoptability information from the terminal device for which this final balance="11" is set. In this way, the specific terminal device to which the final balance is given becomes possible to judge adoptability again taking into account the result of the adoptability judgment of the update data by the majority rule.

Figure 8:
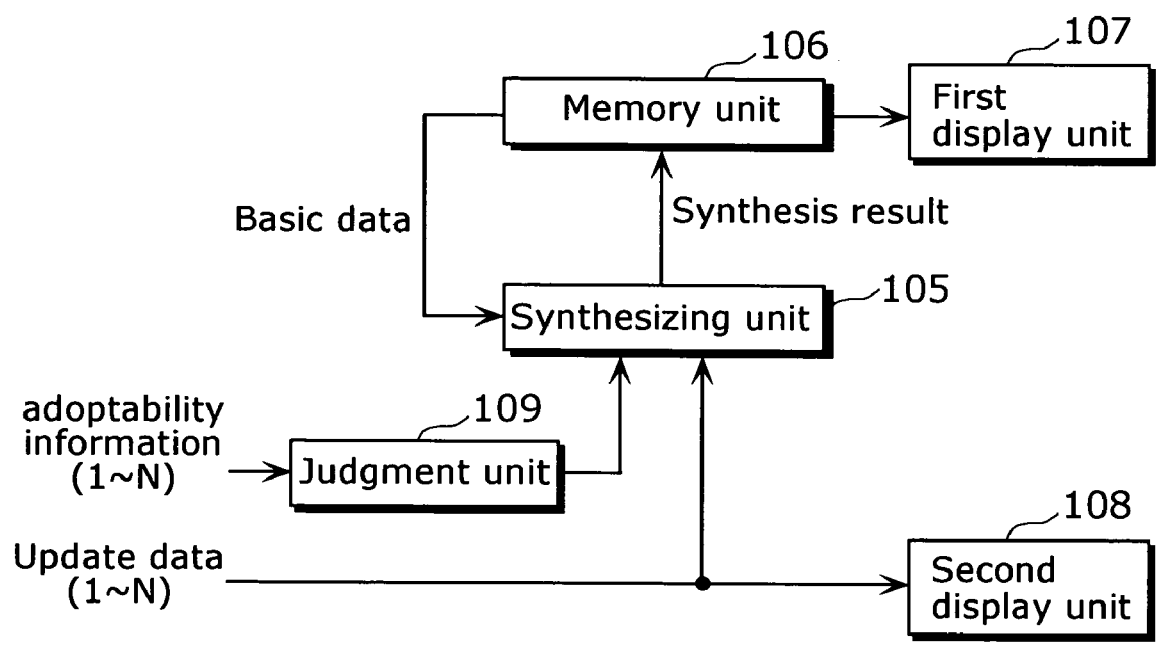
FIG. 8 is a diagram showing the data flow among each unit in the case where the update data is synthesized with the basic data in the terminal device shown in FIG. 2.

Next, as to the management by the layer of the update data and the synthesis to the common data will be explained with reference to FIG. 8, FIG. 9, FIG. 10, FIG. 11, FIG. 12 and FIG. 13. FIG. 8 is a diagram showing the data flow between respective units in the case where the basic data is synthesized with the update data in the terminal device 100 that is shown in FIG. 2.

As shown in FIG. 8, the judging unit 109 of the terminal device 100 receives the adoptability information (1 to N) of the update data (1 to N) that is received from the inputting unit 101 (not shown in any figure) by the user or that is received in the receiving unit 103 (not shown in any figure) from other terminal devices. The judging unit 109 judges whether the update data should be adopted so as to synthesize it with the basic data or not based on the received adoptability information (1 to N) and outputs the judgment result to the synthesizing unit 105. The update data is inputted in the synthesizing unit 105 from the inputting unit 101 or the receiving unit 103, and further the judgment result of the judging unit 109 is inputted. The update data that is inputted in the synthesizing unit 105 is also inputted in the second displaying unit 108 so that the user who uses the terminal device 100 can confirm the update data and the second displaying unit 108 outputs (displays) this update data. The synthesizing unit 105 receives the basic data (the common data 1 in this embodiment) that is stored in the memory unit 106 from the memory unit 106 and synthesizes the update data with the basic data in the case where the judgment result of the judging unit 109 indicates that the update data should be adoptable. In contrast, in the case where the judgment result of the judging unit 109 indicates that this update data should not be adopted, it does not synthesize the update data with the basic data. The synthesis result of the synthesizing unit 105 is outputted to the memory unit 106 and stored in the memory unit 106 as the updated basic data at the time when the synthesis processing is performed. The synthesis result that is stored in the memory unit 106 is read out on the first displaying unit 107 and the first displaying unit 107 outputs (displays) the read-out basic data (the latest basic data in the case where it is updated).

Figure 9:
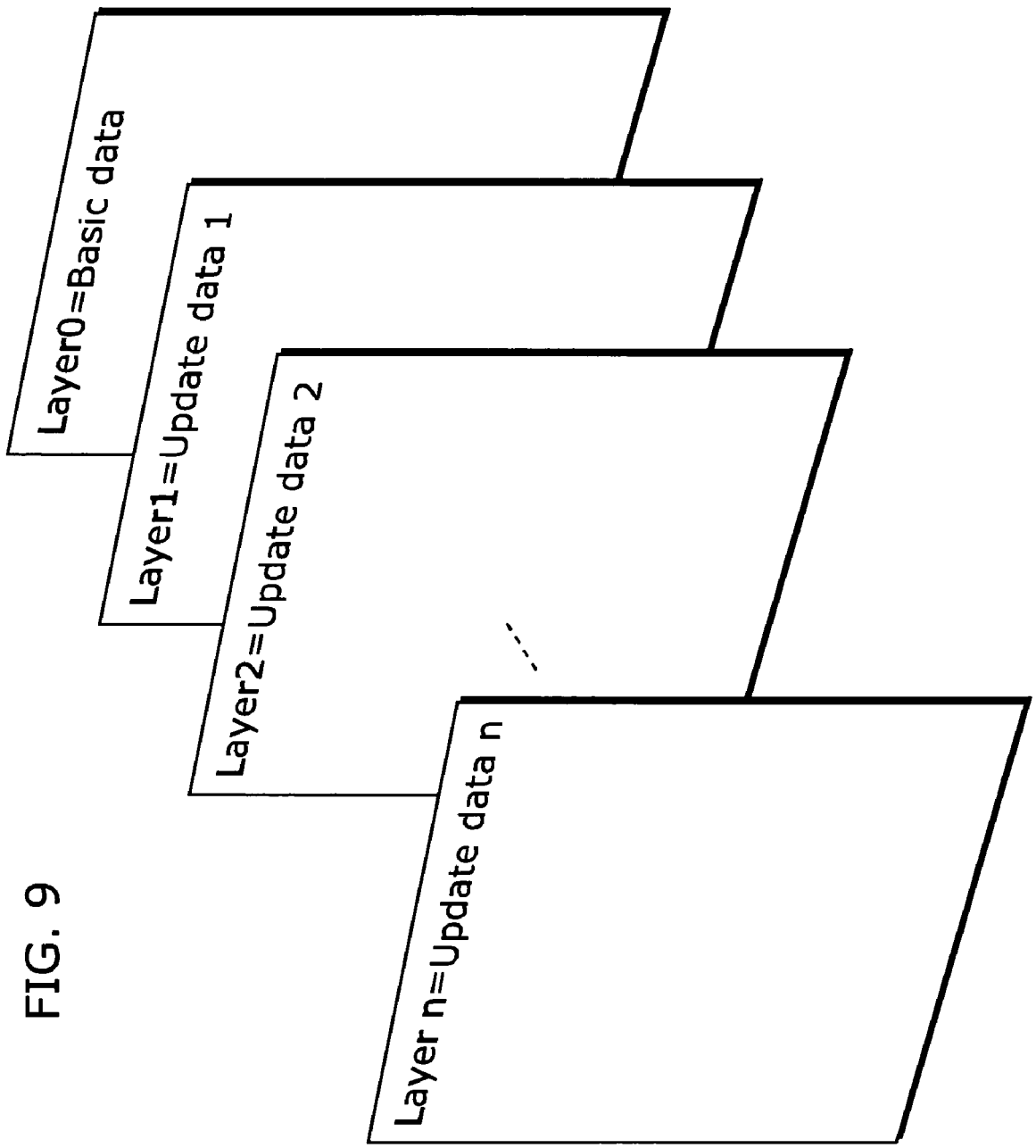
FIG. 9 is a diagram showing the concept in the case where the update data is managed for each layer.

Here, the synthesis concept between the basic data and the update data (1 to N) will be explained with reference to FIG. 9. FIG. 9 is a diagram showing the concept in the case where the update data is managed for every layer. As shown in FIG. 9, for example, the update data from the terminal device 100 is determined as the update data 1, the update data from the terminal device 200 is determined as the update data 2, the update data from the terminal device 300 is determined as the update data 3 and the update data from the terminal device N00 is determined as the update data N and the basic data and those update data from each terminal are managed in the layer. Here, the common data 1 is determined as the layer 0 as the basic data and the following data are put on underneath the layer in order The update data 1 is determined as the layer 1, the update data 2 is determined as the layer 2, the update data 3 is determined as the layer 3 and the update data N is determined as the layer N. In this way, only the update data that does not include any basic data is sent or received between the terminal devices in the information sharing system 500; the update data that is determined as adoptable in the update data 1 to the update data N is synthesized with the basic data of the layer 0 and displayed on the first displaying unit 107 of each terminal device.

Data management by the layer like this is realized by using Scalable Vector Graphics (SVG) which is a two-dimensional vector image description language of eXtensible Markup Language (XML) base that was made public on September of 2001 as the World Wide Web Consortium (W3C) recommendation. In SVG, images are processed not as an aggregate of dots but an aggregate of figures (vector images) such as lines and areas, and thus it becomes possible to display it appropriately according to the viewing environment (such as functions or display forms of the displaying unit of the receiving side device) even in the case where the basic data that is managed for every layer or the update data 1 to N are scaled up, scaled down or synthesized. Also, the SVG file is used solely as the file for recording vector images and used as a part of other XML documents. In this connection, it is possible to realize images in a file of a text form because SVG is a language that is laid down in an XML base. In other words, it is possible to realize images by making text files of SVG documents that are described in XML documents using the text editor. In this way, it becomes possible to search or index these images.

Figure 11A:
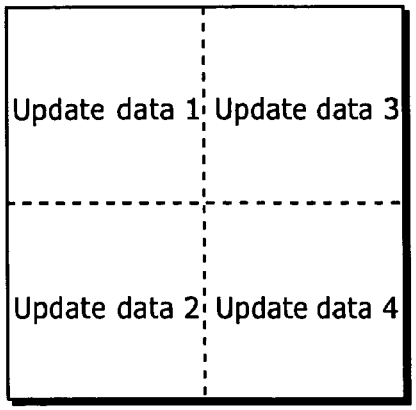
FIG. 11A is a diagram showing the synthesis image of the layer 0 that is the basic data after the update in the case where all the update data layer 1 to 4 are adopted.
Figure 11B:
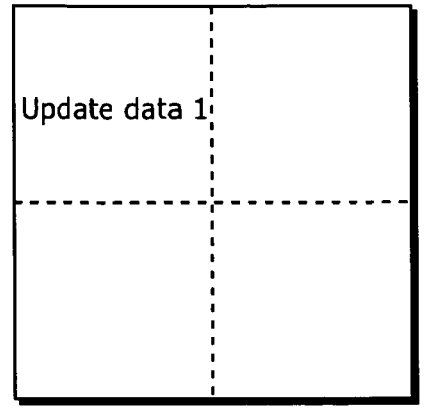
FIG. 11B is a diagram showing the image of the update data 1 of the layer 1.
Figure 11C:
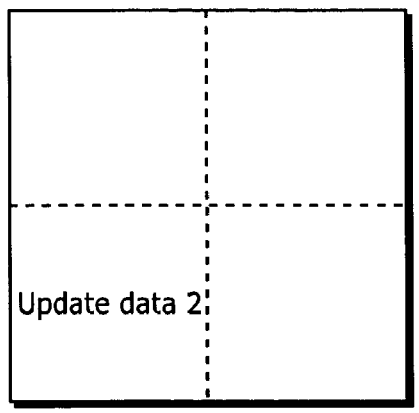
FIG. 11C is a diagram showing the image of the update data 2 of the layer 2.
Figure 11D:
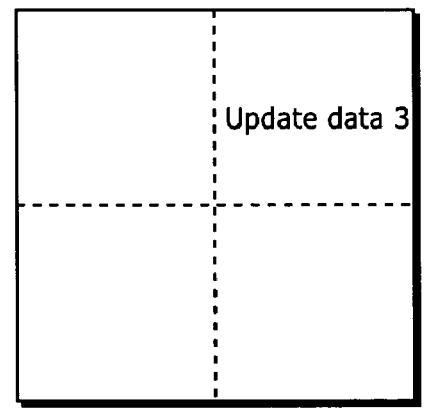
FIG. 11D is a diagram showing the image of the update data 3 of the layer 3.
Figure 11E:
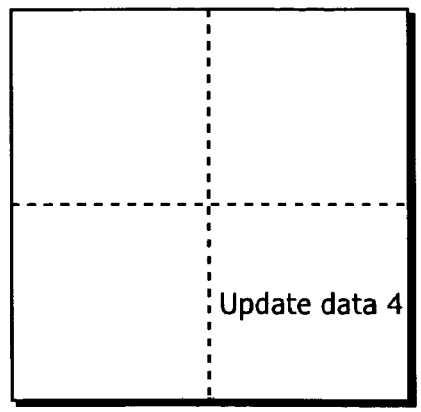
FIG. 11E is a diagram showing the image of the layer 4.

Next, the update information (1 to N) from each terminal is received in an SVG file of a text form and the example for synthesizing and outputting (displaying) this will be explained with reference to FIG. 10 and FIG. 11. FIG. 10 is a diagram showing the description example 1100 of the update data (1 to 4) by XML. FIG. 11 is a diagram showing the images before and after synthesis of the update data 1 to 4. FIG. 11A is a diagram showing the synthesis images of the layer 0 that is the basic data after synthesis in the case where all the update data layer 1 to 4 are adopted. FIG. 11B is a diagram showing the images of the update data 1 of the layer 1. FIG. 11C is a diagram showing the images of the update data 2 of the layer 2. FIG. 11D is a diagram showing the images of the update data 3 of the layer 3. FIG. 11E is a diagram showing the images of the layer 4. In the case where SVG documents are described in XML documents, a specification statement 1101 as shown in FIG. 10 is needed first. After that, in the case of standalone="no" (no: document type definition (DTD)) of SVG in the specification statement 1101, the DTD reference statement 1102 is described in SVG documents as shown in FIG. 10. The description statement 1103 in FIG. 10 specifies the area for making images and the description statement 1104 specifies the ruler line for dividing the area that is specified using the description statement 1103 in FIG. 10. The description statement 1105 describes the text that is called "update data 1" by specifying the location, the font type, the font size, the color and the like. Likewise, the description statement 1106 of FIG. 10 describes "update data 2", the description statement 1107 describes "update data 3" and the description statement 1108 describes "update data 4".

As shown in FIG. 10, in the case where the SVG document that is described by the XML document is transformed into an image using a viewer, it becomes the image with which the update data 1 to 4 are synthesized as shown in FIG. 11A. Also, in the case where the document in which the specification statement 1101 to the description statement 1104 and the description statement 1105 in FIG. 10 are described is transformed into an image, it becomes the image shown in FIG. 11B. In the case where the document in which the specification statement 1101 to the description statement 1104 and the description statement 1106 are described is transformed into an image, it becomes the image shown in FIG. 11C. In the case where the document in which the specification statement 1101 to the description statement 1104 and the description statement 1107 are described is transformed into an image, it becomes the image shown in FIG. 11D. Further, the specification statement 1101 to the description statement 1104 and the description statement 1108 in FIG. 10 are described is transformed into an image, it becomes the image shown in FIG. 11E.

In this way, with a description of the SVG document in the XML document and management of the update data in which the concept of the layer is used, only sending and receiving the SVG file makes it possible to realize the sending and receiving of the update data. Also, the synthesizing unit 105 can generate the updated synthesis image by synthesizing the SVG file of a text form that is received as the update data with the SVG file of the basic data.

The image synthesizing method by SVG document has been explained in the above-mentioned explanation, but the method is not limited to this. It can also be formed in a way that sending and receiving the update data is performed using the text file that is described in the SVG document, the receiving side terminal device receives the text file and the image data of the update data is made so as to be synthesized.

Figure 12:
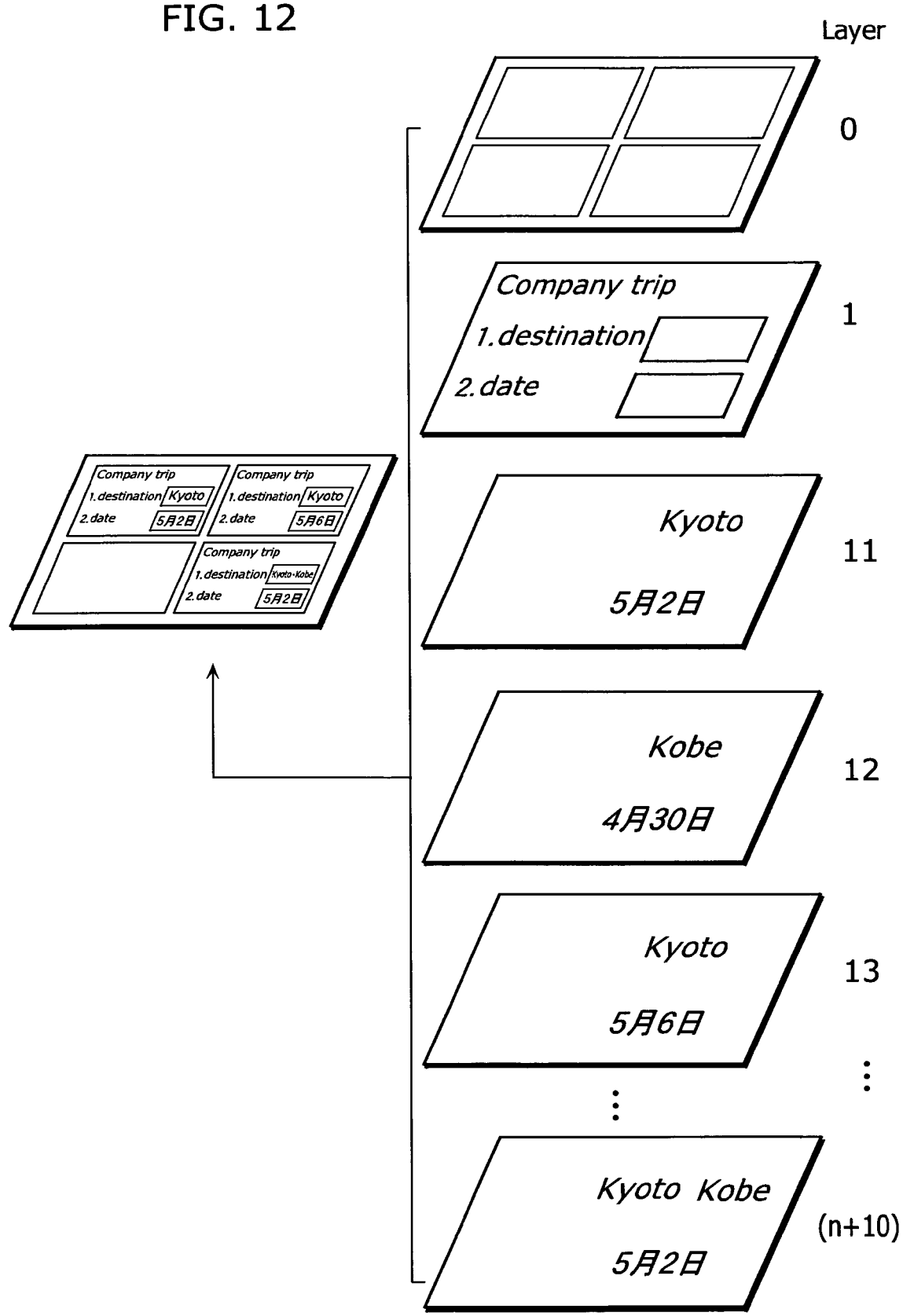
FIG. 12 is a diagram showing the basic data, the update data 1 to N and an example of these synthesis results in the case where the agenda of an electronic meeting is a company trip.

Another applicable example using the update data by SVG document will be explained with reference to FIG. 12 below. FIG. 12 is a diagram showing the basic data, the update data 1 to N and the example of the synthesis result in the case where the agenda of the electronic meeting is a company trip. In the above-mentioned example, the case where the specification statement 1101 to the description statement 1104 (the ruler line is changed to the frame) are shared between the respective terminal devices as the basic data in the above-mentioned embodiment, a case, for example, where the layer 0 and the layer 1 are shared as the basic data and the synthesis image is made will be explained below. Here, for example, the layer 0 to the layer 10 are managed as the layers for the basic data and the update data 1 to N are managed as the layer 11 to (n+10). For example, the basic data of the layer 1 is a template indicating the description that is desired to be suggested by the user of each terminal device in the case where the agenda is the company trip. Here, the basic data that describes the area specification that is explained above are used as the layer 0 as it is in common regardless of agenda; the template of the layer 1 varies depending on the agenda. Items for inputting the destination and the date and time of the company trip are inputted in the basic data of the layer 1 shown in FIG. 12. In this example, the user of each terminal device writes his or her destination and date and time in each item that is shown by this basic data, which makes the update data 1 to N. As shown in FIG. 12, each update data 1 is an example of the update data that is made by user of the terminal device 100 inputting "Kyoto" in the item of destination, "May 2nd" in the item of the date and time shown by the template of the layer 1. Other update data 2 to N are made at the same time and they are broadcast to another terminal device. The adoptabilities of the respective update data 1 to N are judged according to the adoptability information of each terminal device and only the update data that is determined as adoptable is synthesized with the basic data. For example, the synthesizing unit of each terminal device that received the adoptability instruction of the update data 1 synthesizes the update data 1 with the basic data of the layer 1 as the template and synthesizes this synthesis result with the basic data of the layer 0. In this case, as the update data 1 to N are sent with an address for specifying each terminal device as the sending source or an ID, the synthesizing unit can specify the terminal device 100 that is the sending source of the update data 1. In this case, the synthesizing unit synthesizes the update data 1 with the basic data of the layer 0 so that the update data images of the terminal device 100 are displayed in the predetermined area. In this way, in the case where, for example, the update data 1, the update data 2 and the update data 4 in the update data 1 to N are determined as adoptable, the synthesis result by the synthesizing unit of each terminal device becomes the left figure of FIG. 12. As shown in the figure, the display area for the update data that is not adopted is left blank. Also, the update data that follows the update data 5 is displayed after the second page like the update data 1 to 4.

Next, the case where the update history is outputted as the synthesis image of the basic data on the first displaying unit of each terminal device will be explained taking the operation in the terminal device 100 as an example. First, the receiving unit 103 stores the update data in a form that the update history can be understood by the storage date and time, the making date and time, the file name and the like of the update data, every time the update data is received from the external terminal device of the terminal device 100. Further, the receiving unit 103 adds the information that is capable of identifying the sending source (such as the handle name and the name of the terminal device that is previously determined between members). In other words, the information includes the external terminal device in the terminal devices that sent the update data. The inputting unit 101 also adds the information capable of identifying the storage date and time, making date and time and the information that it is made in the terminal device 100 (such as the handle name and the name of the terminal device that is previously set among members) and the information such as the file name to the inputted update data so as to store them in the memory unit 106. Likewise, the sending unit 104 adds the information that is capable of identifying the storage date and time, making date and time and information that it is made in the terminal device 100 (such as the handle name and the name of the terminal device that is previously set among members) and the information such as the file name to the inputted update data so as to broadcast them to other terminal devices. After that, the synthesizing unit 105 makes the synthesis images for displaying the update history referring to the added information of the update data that is stored in the memory unit 106 in this way. It is also possible to make a list (update history) in which the name of the update data file, the update date and time and the like for every terminal device in the sending source separately from the update data instead of adding the update history to the update data and storing them. At that time, as items of update history, temporal components such as the file name, the sending source (information) and storage time, the update contents and the like are desired to be included.

In the above-mentioned example, the basic data that is synthesized by the synthesizing unit 105, the update data that is inputted by the inputting unit 101 and the update data that is received by the receiving unit 103 are stored in the memory unit 106. In addition, here is stored the update basic data that is synthesized so that the user can confirm the update history based on the storage date and time or the file name of the update data referring to the basic data that is updated by the update data in the memory unit 106. This update basic data, for example in the case where the update data 1 to N are managed in the layer 1 to n, is managed as the layer after the layer (n+1).

Figures 13A, 13B:
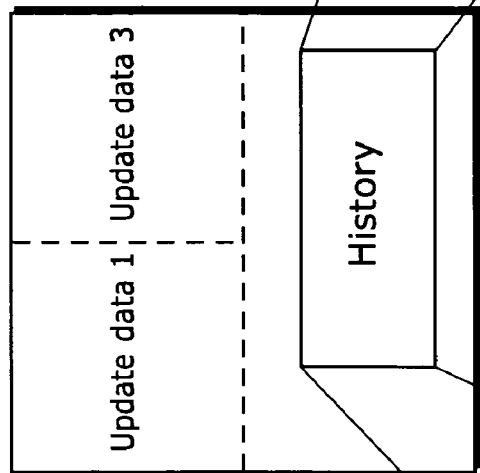
FIG. 13A is a diagram showing an example of the layout of update data and update history.
FIG. 13B is a table showing detailed descriptions of the update history.

FIG. 13 is a diagram showing a display example in the case where the update history is displayed as the synthesis image. FIG. 13A is a diagram showing an example of the layout of the update data and the update history. FIG. 13B is a table showing the detailed description of the update history. As shown in FIG. 13B, as file names that are shown in the item for "file name" of the update data, for example, the update data 1 by the terminal device 100 is shown as "update1", the update data 2 by the terminal device 200 is shown as "update2", the update data 3 by the terminal device 300 is shown as "update3" and the update data 4 by the terminal device 400 is shown as "update4". Here, the same file name can be doubly used and these names are managed using layers 1 to 4. Also, as the names of terminals shown in the item of "sending source", for example, the terminal 100 is shown as "terminal1", the terminal 200 is shown as "terminal2", the terminal 300 is shown as "terminal3" and the terminal 400 is shown as "terminal4". In the item of "storage time" of the update history, for example, the date and time when the update information is stored in the memory unit is displayed in a format of "time/date/month/year". In the item of "update description" of the update history, for example, a user of the sending source of the update data can send simple comments indicating the description of the update data attaching it to the update data and displays the descriptions of the attached comments. After the comments, for example, information that is attached by the input by the user of each terminal device such as "added/deleted" indicating whether this update data is the data as addition or the data for deletion.

In this way, the update history information is described in the SVG format and stored in the memory unit 106 together with the past update data that is stored in an SVG file, generated as the SVG file of the layer 5 shown in FIG. 13B, synthesized with the update data 1 of the layer 1 and the update data 3 of the layer 3 in the synthesizing unit 105 and outputted (displayed) as the synthesis image including the update history shown in FIG. 13A. Also, the synthesizing unit 105 may synthesize the SVG file of the layer 5 that shows the update history information in a way that the update data 2 of the layer 2 and the update data 4 of the layer 4 can be switched at the time of display. In this way, the update data is synthesized in a way that the update history information can be switched at the time of display, the user can refer to the update history information by switching the display as the need arises by referring to, usually the predetermined common data in which the update data is synthesized. Therefore, it is convenient because the update history information that is secondary information does not become an obstacle in displaying the common data that is the primary object.

An example of storage date and time of the update data as a temporal component for the history management has been introduced in the above-mentioned embodiment 1, but it is also possible to use the receiving date and time of the update data instead of the storage date and time in the case where the update data is the one that is received from outside. Further, instead of the storage date and time of the update data, the date and time when the sending source of the update data determines that it is the update data or the date and time when the update data is sent can also be used as the temporal components in the history management.

Also, the synthesis of characters in the SVG format that is described in the XML has been explained as an example of the processing for synthesizing the common data with the update data in the above-mentioned embodiment 1, but this SVG makes it possible to realize an easier image synthesizing. Further, using the SVG animation function makes it possible to realize image synthesis easily. In this way, with the information sharing system that is realized by applying the SVG, in the case where the update of the common data is generated, only the data that is updated can be sent to the members who are registered as a group, which makes it possible to lower the transmission amount of data via the transmission path and update the common data more efficiently.

Also, in this embodiment, the information sharing system as a conference system has been explained, but the present invention is not limited to this. For example, in the case where the common data including images are shared among the members who are registered in a group and the additional image data or the updated image data is synthesized with the common data, sending the added or updated image data after transforming into an SVG file that are described in the XML format makes it possible to add or update the common image data more efficiently like in the case of the conferencing system in this embodiment.

Second Embodiment

In the above-mentioned first embodiment, the information sharing system as a conference system has been explained. But, in the second embodiment, here is explained, with reference to FIG. 14 and FIG. 2, an example case where the information sharing system of the present invention is applied to the system for generating a report by one of the members who are registered as a group making the texts that encompass the report with his or her terminal, or taking pictures for insertions in the report outside the company, and sending them to the server that is used in the company so as to make the report.

Figure 14A:
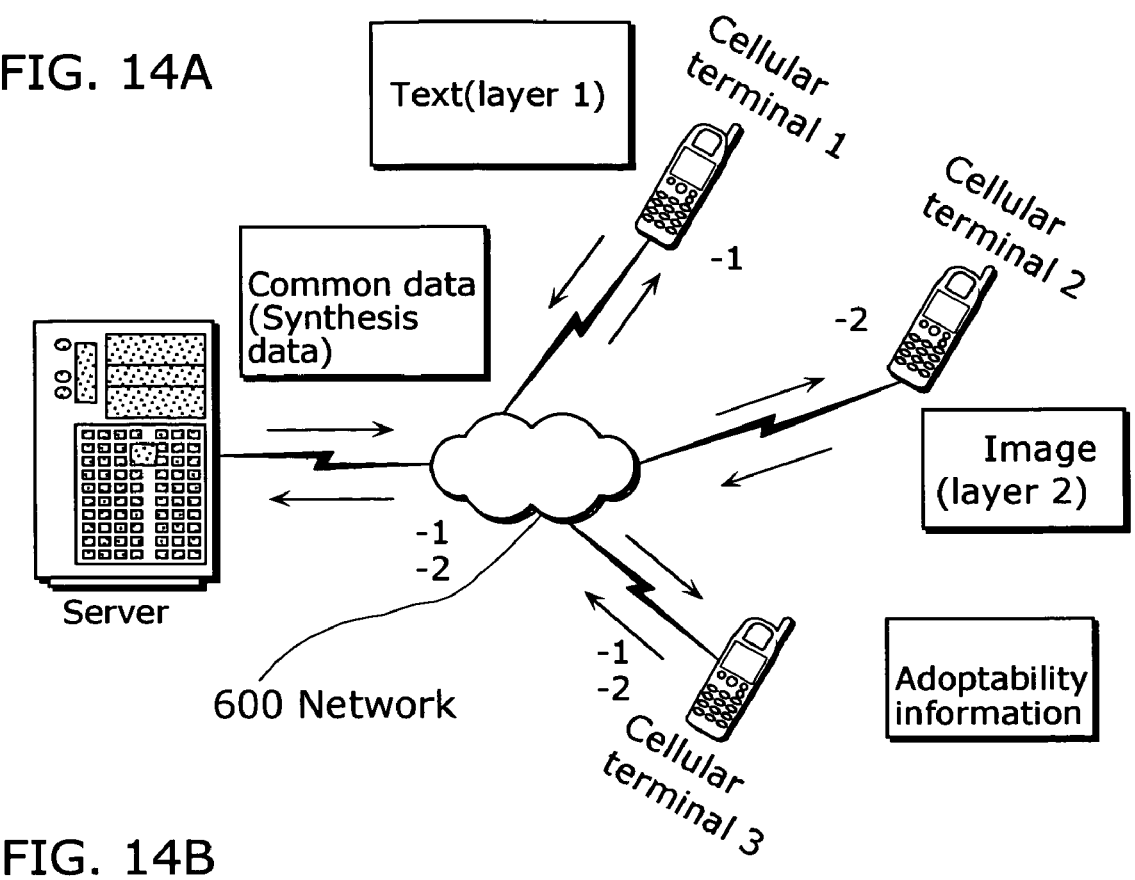
FIG. 14A is a conceptual diagram of the report making system in the second embodiment.
Figure 14B:
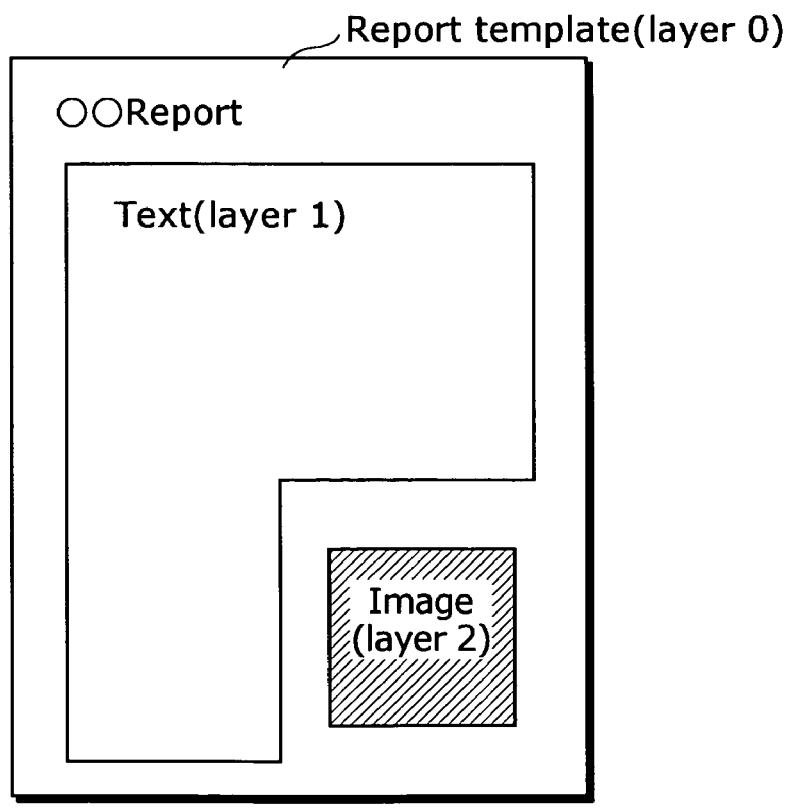
FIG. 14B is a diagram showing an example of a report as a common data.

FIG. 14 is a diagram showing the concept of the report making system in the second embodiment and an example of the common data. FIG. 14A is a conceptual rendering of the report making system in the second embodiment. FIG. 14B is a diagram showing an example of the report as the common data. The structure and the operation as the information sharing system in the second embodiment are the same as the one that is explained in the first embodiment, a detailed explanation is omitted here and only the outline is explained.

The server is the server that is owned by the company and has the function of the terminal device 100 in FIG. 2 that is explained in the first embodiment.

The cellular terminals 1 to 3 are, for example, a cellular phone, a Personal Digital Assistance (PDA) and the like and have the function of digital cameras. And, they have a similar function as the function of the terminal devices 200 to 400 in FIG. 2 that is explained in the first embodiment.

The operation of the report making system in the second embodiment will be explained below.

Here, will be explained an example case where a report is made by preparing the text of the business trip report and the images that are taken by a cellular terminal with a digital camera outside the company and synthesizing the data with the template for a report that is stored in the server of the company. Also, the report is made provided that the user of the cellular terminal 1 and the user of the cellular terminal 2 have gone on a business trip together and the user of the cellular terminal 3 is in another place. Further, the report is made provided that the user of the cellular terminal 3 has the right for authorizing the update data by confirming the descriptions of the report.

The user of the cellular terminal 1 that is registered as a group makes the text of the report outside the company, transforms the text into an SVG file ((1) in FIG. 14A) in the cellular terminal 1 side and sends it to the server and the cellular terminal 3.

Provided that the user of the cellular terminal 2 makes a business trip together with the user of the cellular terminal 1 and is in charge of making the figures for insertions in the report. The user of the cellular terminal 2 transforms photos that are taken with the digital camera of the terminal device outside the company into an SVG file ((2) in FIG. 14A) in cellular terminal 2 side and sends them to the server and the cellular terminal 3.

The cellular terminal 3 receives an SVG file of the report text from the cellular terminal 1 and receives the SVG file of the images for insertion in the report from the terminal device 2. The user of the cellular terminal 3 confirms the description of the report text and the images in the displaying unit of the cellular terminal 3 and inputs the adoptability of these images in the cellular terminal 3. The cellular terminal 3 sends the adoptability information ((3)-1 and (3)-2 in FIG. 14A) indicating the result that is inputted by the user to the cellular terminal 1, the cellular terminal 2 and the server that are the sending source of the report text and the images. In other words, the cellular terminal 3 sends the adoptability information ((3)-2 in FIG. 14A) of images to the server and the terminal device 2 of the sending source and sends the adoptability information ((3)-1 in FIG. 14A) of the text to the server and the cellular terminal 1 of the sending source.

The user of the cellular terminal 1 receives the adoptability information on the sent report text, in the case of unadoptable, the modified version of the SVG file ((1) in FIG. 14A) of the modified report text is resent to the server and the cellular terminal 3.

The user of the cellular terminal 2 receives the adoptability information on the sent images, in the case of unadoptable, resends the modified version of the SVG file of the modified images ((2) in FIG. 14B) to the server and the cellular terminal 3.

The server generates an SVG file on which the report text (the layer 1) and the images (the layer 2) that are previously received with the template of the report (the layer 0) at the time when the adoptability information on the report text and the images are judged to be adoptable (FIG. 14B).

The server sends the SVG file that is made by synthesizing the report template (the layer 0) with the text (the layer 1) and the images (the layer 2) at the time when each terminal device that is registered as a group requests the server to send the report that is completed by synthesis processing.

In the above-mentioned second embodiment, an example where adoptability is judged by making the user of the cellular terminal 3 have the right for confirming and authorizing the descriptions of the report, but as shown in the first embodiment, it is also possible to confirm the descriptions of the report text and the images for insertions in each terminal device that is registered as a group and make a final adoptability judgment based on the adoptability information from each terminal device.

The output of the synthesis data in the present invention is not limited to the output on the display such as a Cathode Ray Tube (CRT) that is the first displaying unit and the second displaying unit, a liquid crystal and an organic electroluminescence, but the output may be the one performed on the image forming apparatus with a printer engine such as a thermal transfer style (a sublimation dye transfer printing system and a hot melt printing system), a thermal system, an ink jet system, an electronic photograph system and the like.

Also, in the second embodiment, an example where a cellular terminal, a cellular phone or a personal Digital Assistance (PDA) and the like has the function of the terminal device of the present invention, but examples are not limited to this, the above-mentioned image forming apparatus, a digital camera, a receiver capable of receiving contents that are described in Broadcast Markup Language (BML) contents, an electronic paper, a computer and the like may have the function of the above-mentioned terminal device of the present invention.

Up to this point, in the information sharing system of the present invention, in the case where there is update data, each terminal device that received this sends the adoptability information showing whether the update data should be adopted or not to the terminal device that makes the judgment. Each terminal device can synthesize the update data whose adoptability as new information is judged with the existing common data according to the judgment result based on self-generated adoptability information and the adoptability information from the other terminal device. Therefore, according to the information sharing system of the present invention, there is an effect that it is possible to realize information sharing on which user opinions of the respective terminal devices are reflected and update common information.

What is claimed is:

1. A communication apparatus for sharing image information by exchanging data mutually with a plurality of other communication apparatuses and for updating the image information, wherein said communication apparatus is to be connected to the other communication apparatuses via a network and the other communication apparatuses are connected to each other via the network, said communication apparatus comprising:

a memory unit operable to store the image information;

a first outputting unit operable to output, to a respective user of each of the other communication apparatuses an image indicated by common information that has been stored in the memory unit, and that has already been shared or can be shared among the other communication apparatuses and said communication apparatus;

an inputting unit operable to receive update information indicating the image and inputted by the respective user of each of the other communication apparatuses and inputted by a user of said communication apparatus so as to update the common information;

a sending unit operable to send the update information received by the inputting unit to one or more of the other communication apparatuses;

a receiving unit operable to receive the update information inputted by at least one of the other communication apparatuses so as to update the common information sent by the at least one of the other communication apparatuses;

a second outputting unit operable to output, to the respective user of each of the other communication apparatuses, the image indicated by the update information received by the inputting unit from the other communication apparatuses, or the image indicated by the update information sent by the at least one of the communication apparatuses and received by the receiving unit;

a judging unit operable to obtain, from each of a predetermined number of communication apparatuses from among the plurality of other communication apparatuses, adoptability information indicating whether or not the update information is adoptable for each of the predetermined number of communication apparatuses, and to judge whether or not the update information should be adopted for all of the plurality of communication apparatuses which have shared or can share the common information corresponding to the update information based on a number of adoptable and a number of not adoptable shown in the obtained adoptability information;

a Scalable Vector Graphics (SVG) file generating unit operable to generate a file including the common information and the update information as a Scalable Vector Graphics (SVG) file described in an XML format; and a synthesizing unit operable to synthesize the image indicated by the common information stored in the memory unit and the image indicated by the update information into an image, by updating the common information using both the common information and the update information included in the SVG file generated by the SVG file generating unit, wherein, in the case where the judging unit judges that the update information inputted by each of the at least one communication apparatus from among said communication apparatus and the plurality of other communication apparatuses should be adopted, the update information is adopted, the synthesizing unit synthesizes the update information with the common information, and the memory unit stores the updated common information.

2. The communication apparatus according to claim 1, wherein, in the case where the update information is received from the at least one communication apparatus from among said communication apparatus and the plurality of other communication apparatuses, the first outputting unit outputs the common information updated by the synthesizing unit after the second outputting unit has outputted the update information.

3. The communication apparatus according to claim 1, wherein the synthesizing unit is provided with the update information and the common information by a file assigned with history management information including information about an update date and time and a sending source.

4. The communication apparatus according to claim 1, wherein the communication apparatus generates a list of update information for every sending source of the update information.

5. The communication apparatus according to claim 1, wherein the judging unit obtains the adoptability information from the at least one communication apparatus from among said communication apparatus and the plurality of other communication apparatuses.

6. The communication apparatus according to claim 1, wherein the judging unit determines whether or not the update information should be adopted based on: a majority decision on the adoptability information; or on a decision by a predetermined number of communication apparatuses or a larger number of communication apparatuses connected to each other via the network.

7. The communication apparatus according to claim 5, further comprising:

a setting unit operable to set a right for sending the adoptability information in the communication apparatus and the plurality of other communication apparatuses, wherein the judging unit determines whether or not the update information should be adopted based on the adoptability information obtained from any of the communication apparatuses provided with the right for sending the adoptability information.

8. The communication apparatus according to claim 7, wherein the setting unit sets the right level indicating any of at least two levels, the judging unit determines, based on the adoptability information from a specific communication apparatus, which level to be determined is finally set as the right level indicating whether or not the update information should be adopted.

9. The communication apparatus according to claim 1, further comprising:

an inquiring unit operable to inquire the user of the communication apparatus about whether or not the update information received by the receiving unit can be adopted as a target of the synthesis performed by the synthesizing unit; and an adoptability information sending unit operable to send information obtained from the user to one or more of the other communication apparatuses as the adoptability information inquired by the inquiring unit.

10. The communication apparatus according to claim 1, further comprising:

a printer engine for printing based on the common information outputted by the first outputting unit.

11. The communication apparatus according to claim 1, wherein the at least one communication apparatus from among: the communication apparatus and the plurality of other communication apparatuses is one of a cellular phone, a personal Digital Assistance (PDA), a digital camera and a receiver capable of receiving contents described in Broadcast Markup Language (BML) from a broadcasting station.

12. An information sharing system comprising:

a plurality of communication apparatuses connected to each other via a network, wherein the communication apparatuses are operable to share image information by exchanging data mutually among the plurality of communication apparatuses, and to repeatedly update the image information each communication apparatus comprising:

a memory unit operable to store the image information;

a first outputting unit operable to output, to a respective user of each of the other communication apparatuses an image indicated by common information that has been stored in the memory unit, and that has already been shared or can be shared among the communication apparatuses;

an inputting unit operable to receive update information indicating the image and inputted by the respective user of each of the other communication apparatuses and inputted by a user of said communication apparatus so as to update the common information;

a sending unit operable to send the update information received by the inputting unit to one or more of the other communication apparatuses;

a receiving unit operable to receive the update information inputted by at least one of the other communication apparatuses so as to update the common information sent by the at least one of the other communication apparatuses;

a second outputting unit operable to output, to the respective user of each of the other communication apparatuses, the image indicated by the update information received by the inputting unit from the other communication apparatuses, or the image indicated by the update information sent by the at least one of the communication apparatuses and received by the receiving unit;

a judging unit operable to obtain, from each of a predetermined number of the communication apparatuses, adoptability information indicating whether or not the update information is adoptable for each of the predetermined number of communication apparatuses, and to judge whether or not the update information should be adopted for all of the plurality of communication apparatuses which have shared or can share the common information corresponding to the update information based on a number of adoptable and a number of not adoptable shown in the obtained adoptability information;

a Scalable Vector Graphics (SVG) file generating unit operable to generate a file including the common information and the update information as a Scalable Vector Graphics (SVG) file described in an XML format; and a synthesizing unit operable to synthesize the image indicated by the common information stored in the memory unit and the image indicated by the update information into an image by updating the common information using both the common information and the update information included in the SVG file generated by the SVG file generating unit, wherein, in the case where the judging unit judges that the update information inputted by each of the at least one communication apparatus should be adopted, the update information is adopted, the synthesizing unit synthesizes the update information with the common information, and the memory unit stores the updated common information.

13. The information sharing system according to claim 12, wherein each respective communication apparatus of the plurality of communication apparatuses further comprises:

an inputting unit operable to receive the update information inputted by a user of the respective communication apparatus so as to update the common information; and a receiving unit operable to receive the update information inputted and by the at least one other communication apparatus, other than the respective communication apparatus, so as to update the common information that is sent from the at least one other communication apparatus, wherein the second outputting unit outputs the update information in the case where the update information has been received by at least one of the inputting unit and the received unit, and the synthesizing unit synthesizes the update information with the common information stored in the memory unit in the case where the update information has been received by at least one of the inputting unit and the receiving unit.

14. An information sharing method for sharing image information by exchanging data mutually between a plurality of communication apparatuses that are connected to each other via a network and repeatedly updating the image information, the method comprising:

storing the image information in a memory unit;

outputting, to a respective user of each of the communication apparatuses, an image indicated by common information that has been stored in the memory unit, and that has already been shared or can be shared among the communication apparatuses;

receiving update information indicating the image and inputted by the respective user of each of the communication apparatuses so as to update the common information;

sending the update information received by the receiving of the update information indicating the image and inputted by the respective user of each of the communication apparatuses to one or more of the communication apparatuses;

receiving the update information inputted by at least one of the communication apparatuses so as to update the common information sent by the at least one of the other communication apparatus;

outputting, to the respective user of each of the communication apparatuses, the image indicated by the update information received by the receiving of the update information inputted by the respective user of each of the communication apparatuses, or the image indicated by the update information sent by the at least one of the communication apparatuses and received by the receiving of the update information inputted by the at least one of the other communication apparatuses;

obtaining, from each of a predetermined number of the communication apparatuses, adoptability information indicating whether or not the update information is adoptable for each of the predetermined number of communication apparatuses, and judging whether or not the update information should be adopted for all of the plurality of communication apparatuses which have shared or can share the common information corresponding to the update information based on a number of adoptable and a number of not adoptable shown in the obtained adoptability information;

generating a file including the common information and the update information as a Scalable Vector Graphics (SVG) file described in an XML format; and synthesizing the image indicated by the common information stored in the memory unit and the image indicated by the update information into an image, by updating the common information using both the common information and the update information included in the generated SVG file, wherein, in the case where the judging judges that the update information inputted by each of the at least one communication apparatus should be adopted, the update information is adopted, the update information is synthesized with the common information, and the updated common information is stored in the memory unit.

15. The information sharing method according to claim 14, the method further comprising:

inputting the update information into one of the communication apparatuses so as to update the common information; and receiving the update information inputted by at least one other communication apparatus, other than said one of the communication apparatuses, so as to update the common information that is sent from the at least one other communication apparatus;

wherein, in the outputting update information, the update information is outputted in the case where the update information has been received by at least one of the inputting and the receiving, and in the synthesizing, the update information is synthesized with the common information stored in the storing in the case where the update information has been received by at least one of the inputting and the receiving.

16. A computer program stored on a computer readable storage medium for causing a communication apparatus to share image information by exchanging data mutually with a plurality of other communication apparatuses and to update the image information, wherein the communication apparatus is to be connected to the other communication apparatuses via a network and the other communication apparatuses are connected to each other via the network, said computer program causing the communication apparatus to implement at least:

storing the image information in a memory unit;

outputting, to a respective user of each of the other communication apparatuses, an image indicated by common information that has been stored in the memory unit, and that has already been shared or can be shared among the other communication apparatuses and said communication apparatus;

receiving update information indicating the image and inputted by the respective user of each of the communication apparatuses so as to update the common information;

sending the update information received by the receiving of the update information indicating the image and inputted by the respective user of each of the communication apparatuses to one or more of the communication apparatuses;

receiving the update information inputted by at least one of the communication apparatuses so as to update the common information sent by the at least one of the other communication apparatus;

outputting, to the respective user of each of the communication apparatuses, the image indicated by the update information received by the receiving of the update information inputted by the respective user of each of the communication apparatuses, or the image indicated by the update information sent by the at least one of the communication apparatuses and received by the receiving of the update information inputted by the at least one of the other communication apparatuses;

obtaining, from each of a predetermined number of communication apparatuses from among the plurality of other communication apparatuses, adoptability information indicating whether or not the update information is adoptable for each of the predetermined number of communication apparatuses, and judging whether or not the update information should be adopted for all of the plurality of communication apparatuses which have shared or can share the common information corresponding to the update information based on a number of adoptable and a number of not adoptable shown in the obtained adoptability information;

generating a file including the common information and the update information as a Scalable Vector Graphics (SVG) file described in an XML format; and synthesizing the image indicated by the common information stored in the memory unit and the image indicated by the update information into an image, by updating the common information using both the common information and the update information included in the generated SVG file, wherein, in the case where the judging judges that the update information inputted by each of the at least one communication apparatus from among said communication apparatus and the plurality of other communication apparatuses should be adopted, the update information is adopted, the update information is synthesized with the common information, and the updated common information is stored in the memory unit.

* * * * *